(12) United States Patent
Ohta

(10) Patent No.: US 7,925,467 B2
(45) Date of Patent: *Apr. 12, 2011

(54) ORIENTATION CALCULATION APPARATUS, STORAGE MEDIUM HAVING ORIENTATION CALCULATION PROGRAM STORED THEREIN, GAME APPARATUS, AND STORAGE MEDIUM HAVING GAME PROGRAM STORED THEREIN

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 288 days.

This patent is subject to a terminal disclaimer.

(21) Appl. No.: 12/216,624

(22) Filed: Jul. 8, 2008

(65) Prior Publication Data

US 2009/0326847 A1    Dec. 31, 2009

(30) Foreign Application Priority Data

Jun. 30, 2008  (JP) ................................. 2008-171518
Jun. 30, 2008  (JP) ................................. 2008-171519

(51) Int. Cl.
  *G06F 19/00*  (2011.01)
(52) U.S. Cl. ......................................... 702/150; 702/85
(58) Field of Classification Search .................. 702/150, 702/85

See application file for complete search history.

(56) References Cited

U.S. PATENT DOCUMENTS

| | | | |
|---|---|---|---|
| 5,574,479 A | 11/1996 | Odell | |
| 5,627,565 A | 5/1997 | Morishita et al. | |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,405,725 B2 | 7/2008 | Mohri et al. | |
| 7,414,611 B2 | 8/2008 | Liberty | |

FOREIGN PATENT DOCUMENTS

| | | |
|---|---|---|
| JP | A-H11-085387 | 3/1999 |
| JP | 2000-97637 | 4/2000 |
| JP | 2000-308756 | 11/2000 |
| JP | 2004-264892 | 9/2004 |
| JP | A-2004-264892 | 9/2004 |

OTHER PUBLICATIONS

ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.
Pictures of Microsoft Xwand retrieved on May 13, 2009 from http://www.kf12.com/blogs/uploads/xwand.jpg and http://www.cs.cmu.edu/%7Edwilson/images/xwand.jpg.
Wilson, Andrew D., et al.; "Demonstration of the XWand Interface for Intelligent Spaces"; Microsoft Research; UIST '02 Companion; pp. 37-38.

(Continued)

*Primary Examiner* — Drew A Dunn
*Assistant Examiner* — Hien X Vo
(74) *Attorney, Agent, or Firm* — Nixon & Vanderhye, P.C.

(57) ABSTRACT

An orientation calculation apparatus obtains data from an input device comprising at least a gyro sensor, an acceleration sensor, and an image pickup device, so as to calculate an orientation of the input device. Firstly, the orientation calculation apparatus calculates an orientation of the input device in accordance with an angular rate detected by the gyro sensor. Secondly, the orientation is corrected in accordance with acceleration data detected by the acceleration sensor. Further, the orientation is corrected in accordance with an image of a predetermined subject to be taken by the image pickup device.

40 Claims, 13 Drawing Sheets

OTHER PUBLICATIONS

Wilson, Daniel, et al.; "Gesture Recognition Using The XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dll?ViewItem&item=350096666675&indexURL.

Japanese Official Action dated Jul. 31, 2008 issued in corresponding Japanese Application No. 2008-171518.

ORIENTATION CALCULATION APPARATUS, STORAGE MEDIUM HAVING ORIENTATION CALCULATION PROGRAM STORED THEREIN, GAME APPARATUS, AND STORAGE MEDIUM HAVING GAME PROGRAM STORED THEREIN

CROSS REFERENCE TO RELATED APPLICATION

The disclosures of Japanese Patent Application Nos. 2008-171518 and 2008-171519, filed on Jun. 30, 2008, are incorporated herein by reference.

BACKGROUND

1. Field

Example embodiments of the present invention relate to an orientation calculation apparatus or a storage medium having an orientation calculation program stored therein, and more particularly to an orientation calculation apparatus for calculating an orientation of an input device or a storage medium having stored therein an orientation calculation program for calculating an orientation of an input device.

2. Description of the Background Art

Conventionally, a technique for calculating an orientation of an input device by using an acceleration sensor and a gyro sensor is considered. For example, Patent Document 1 (Japanese Laid-Open Patent Publication No. 2000-308756) discloses a game apparatus using an input control device including an acceleration sensor and a gyro sensor. This game apparatus controls as word held by a game character in accordance with movement of the input control device. Specifically, data representing an action of wielding the sword is generated based on an output from the acceleration sensor, and data representing an orientation of the sword is generated based on an output from the gyro sensor.

When the orientation is calculated by using the gyro sensor as described in Patent Document 1, an error may occur between the calculated orientation and an actual orientation of the input control device. For example, when the movement of the input control device is slow, the gyro sensor may fail to detect an angular rate of the input control device, whereas when the movement of the input control device is vigorous, the angular rate of the input control device may be outside a range in which the gyro sensor is allowed to detect for the angular rate. Further, also when the angular rate abruptly changes in a period shorter than an interval of an output of angular rate data, the error may occur. The error of the angular rate is cumulatively added to the orientation calculated based on the angular rate over the passage of time, and therefore the error of the orientation may be increased. In Patent Document 1, the error of the orientation calculated by the gyro sensor is not considered, and therefore the orientation may not be accurately calculated.

SUMMARY

Therefore, an example aspect of example embodiments of the present invention is to provide an orientation calculation apparatus capable of accurately calculating an orientation of an input device by using a gyro sensor, or a storage medium having stored therein an orientation calculation program for accurately calculating an orientation of an input device by using a gyro sensor.

Example embodiments of the present invention have the following features to attain the example aspect mentioned above. Here, the reference numerals, the supplementary description and the like in the parentheses indicate a correspondence with the embodiment described below in order to aid in understanding example embodiments of the present invention and are not intended to limit, in any way, the scope of the present invention.

A first aspect is directed to an orientation calculation apparatus (game apparatus 3) for obtaining data (operation data) from an input device (8) comprising at least a gyro sensor (55, 56), an acceleration sensor (37), and an image pickup means (image pickup element 40), so as to calculate an orientation of the input device. The orientation calculation apparatus comprises orientation calculation means (the CPU 10 for performing step S4. Hereinafter, only step numbers will be represented); first correction means (S5); and second correction means (S6). The orientation calculation means calculates a first orientation (first orientation data 68) of the input device in accordance with an angular rate (angular rate data 63) detected by the gyro sensor. The first correction means corrects the first orientation in accordance with acceleration data (64) detected by the acceleration sensor. The second correction means corrects the first orientation in accordance with an image (pickup image) of a predetermined subject to be taken by the image pickup means.

According to the above description, the first orientation calculated by using the gyro sensor is corrected based on the acceleration data and an image of the predetermined subject to be taken. Therefore, an error in the orientation calculated by the gyro sensor can be corrected, thereby enabling the orientation of the input device to be accurately calculated by using the gyro sensor.

Further, the first correction means may correct the first orientation (angle θ1) so as to approach a second orientation (angle θ2) of the input device, the second orientation being an orientation in which a direction of an acceleration represented by the acceleration data is a vertically downward direction (S21).

According to the above description, the first orientation is caused to approach the second orientation determined based on an acceleration which is a detection result from the acceleration sensor, thereby easily correcting the first orientation by using the second orientation;

Further, the first correction means may correct the first orientation such that the closer a magnitude of the acceleration is to a magnitude of a gravitational acceleration, the more closely the first orientation approaches the second orientation (S18).

According to the above description, the closer the magnitude of the acceleration detected by the acceleration sensor is to the magnitude of the gravitational acceleration, the more strongly the second orientation influences the orientation to be corrected. It is assumed that the closer the magnitude of the acceleration is to the magnitude of the gravitational acceleration, the more accurately the detection result from the acceleration sensor represents the direction of the gravitational acceleration, and therefore it is assumed that the second orientation is more accurately obtained. According to the above aspect, when the second orientation is not accurately obtained, the first orientation is not substantially corrected, whereas when the second orientation is accurately obtained, the first orientation is corrected so as to more closely approach the second orientation, thereby enabling the orientation to be corrected with enhanced accuracy.

Further, the first correction means may correct the first orientation only when a difference between a magnitude of the acceleration and a magnitude of a gravitational acceleration is smaller than a predetermined reference value (S15).

According to the above description, when a difference between a magnitude of an acceleration detected by the acceleration sensor and a magnitude of the gravitational acceleration is greater than or equal to a predetermined reference, the first correction means does not make the correction. That is, when it is assumed that the detection result from the acceleration sensor does not accurately represent the direction of the gravitational acceleration (the detection result represents an inaccurate direction), the correction using the second orientation is not made, resulting in the orientation being calculated with enhanced accuracy.

Further, the second correction means may correct the first orientation so as to approach a third orientation (third orientation data 76) of the input device at a predetermined rate, the third orientation being an orientation which is calculated from a direction and/or a position of the predetermined subject in an image taken by the image pickup means (S37).

According to the above description, the first orientation is caused to approach the third orientation determined by the pickup image from the image pickup means, thereby easily correcting the first orientation by using the third orientation. Further, the correction using the pickup image is made only when the image pickup means takes an image of an imaging subject, and therefore the second correction process cannot be performed in some cases, and the second correction process can be performed in the other cases. In a case where it is assumed that the second correction means corrects the first orientation so as to coincide with the third orientation, when a state where the second correction process is not allowed to be performed shifts to a state where the second correction process is allowed to be performed, the first orientation may be abruptly changed in the second correction process. On the other hand, according to the above aspect, the first orientation approaches the third orientation at a predetermined rate, and therefore, also in the case described above, the abrupt change of the first orientation can be prevented. Therefore, a user may not feel the operation unnatural due to the first orientation being abruptly changed, thereby enhancing the operability of the input device.

Further, the second correction means may calculate, among the third orientation, an orientation (roll orientation component data 73), associated with a roll direction, relative to an imaging direction of the image pickup means, based on the direction of the predetermined subject in the image taken by the image pickup means.

According to the above description, the orientation associated with the roll direction is calculated based on the direction of the imaging subject in the pickup image taken by the image pickup means, and therefore the orientation associated with the roll direction can be accurately calculated. Therefore, the third orientation can be calculated with enhanced accuracy, which results in the first orientation being corrected with enhanced accuracy.

Further, the second correction means may calculate, among the third orientation, an orientation (yaw orientation component data 74), associated with a pitch direction or/and a yaw direction (in the present embodiment, associated with only a yaw direction), relative to an imaging direction of the image pickup means, based on the position of the predetermined subject in the image taken by the image pickup means.

According to the above description, the orientations associated with the pitch direction and/or the yaw direction are calculated based on the position of the imaging subject in the pickup image taken by the image pickup means, and therefore the orientations associated with the pitch direction and/or the yaw direction can be accurately calculated. Therefore, the third orientation can be calculated with enhanced accuracy, which results in the first orientation being corrected with enhanced accuracy.

Further, the second correction means may determine, based on the first orientation, whether or not the image pickup means is facing toward a direction in which the image pickup means is allowed to take the image of the predetermined subject, and correct the first orientation only when the image pickup means is facing toward the direction in which the image pickup means is allowed to take the image of the predetermined subject.

The image pickup means may erroneously detect, (as the imaging subject), an object which is not the imaging subject, when the image pickup means is not facing toward the direction in which the predetermined imaging subject is allowed to be taken. At this time, inaccurate calculation of the third orientation may lead to inaccurate correction. On the other hand, according to the above aspect, the correction is not made in the case described above, and therefore the correction of the first orientation using the inaccurate third orientation can be prevented, and, as a result, the first orientation can be calculated with enhanced accuracy.

Further, the second correction means may correct the first orientation having been corrected by the first correction means.

According to the above description, the correction using the first orientation determined from the detection result of the acceleration sensor is firstly made, and thereafter the correction using the second orientation determined based on the pickup image is made. That is, the correction using the second orientation preferentially influences the final correction result. In general, the second orientation is more accurate than the first orientation, and therefore the correction using the second orientation is preferentially reflected on the correction result, thereby calculating the orientation with enhanced accuracy.

A second aspect is directed to an orientation calculation apparatus (game apparatus 3) for obtaining data from an input device (8) comprising at least a gyro sensor (55, 56) and an acceleration sensor (37), so as to calculate an orientation of the input device. The orientation calculation apparatus comprises orientation calculation means (S4) and correction means (S5). The orientation calculation means calculates a first orientation (first orientation data 68) of the input device in accordance with an angular rate (angular rate data 63) detected by the gyro sensor. The correction means corrects the first orientation such that the first orientation approaches a second orientation (angle $\theta 1$) of the input device, the second orientation (angle $\theta 2$) being an orientation in which a direction of an acceleration represented by acceleration data (64) detected by the acceleration sensor is a vertically downward direction (S21).

According to the second aspect, the first orientation calculated by using the gyro sensor is corrected based on an image of an imaging subject to be taken. Therefore, an error in the orientation calculated by using the gyro sensor can be corrected, thereby accurately calculating the orientation of the input device by using the gyro sensor.

Further, the correction means may correct the first orientation such that the closer a magnitude of the acceleration is to a magnitude of a gravitational acceleration, the more closely the first orientation approaches the second orientation (S18).

According to the above description, the closer the magnitude of the acceleration detected by the acceleration sensor is to the magnitude of the gravitational acceleration, the more strongly the second orientation influences the orientation to be corrected. As described above, it is assumed that the closer the magnitude of the acceleration is to the magnitude of the gravitational acceleration, the more accurately the detection result of the acceleration sensor represents the direction of the gravitational acceleration, that is, the more accurately the second orientation is obtained. According to the above aspect, when the second orientation is not accurately obtained, the first orientations not substantially corrected, whereas when the second orientation is accurately obtained, the first orientation is more accurately corrected so as to approach the second orientation, thereby enabling the orientation to be corrected with enhanced accuracy.

Further, the correction means may correct the first orientation only when a difference between a magnitude of the acceleration and a magnitude of a gravitational acceleration is smaller than a predetermined reference value (S15).

According to the above description, when a difference between a magnitude of an acceleration detected by the acceleration sensor and the magnitude of the gravitational acceleration is greater than or equal to a predetermined reference, the correction means does not make the correction. That is, when it is assumed that the detection result of the acceleration sensor does not accurately represent the direction of the gravitational acceleration (the detection result represents an inaccurate direction), the correction using the second orientation is not made, resulting in the orientation being calculated with enhanced accuracy.

A third aspect is directed to an orientation calculation apparatus (game apparatus 3) for obtaining data (operation data) from an input device (8) comprising at least a gyro sensor (55, 56) and an image pickup means (image pickup element 40), so as to calculate an orientation of the input device. The orientation calculation apparatus comprises: orientation calculation means (S4) and correction means (S6). The orientation calculation means calculates a first orientation (first orientation data 68) of the input device in accordance with an angular rate (angular rate data 63) detected by the gyro sensor. The correction means corrects the first orientation so as to approach a second orientation (third orientation data 76) of the input device at a predetermined rate, the second orientation being an orientation which is calculated from a direction and/or a position of a predetermined subject in an image (pickup image) taken by the image pickup means (S37).

According to the third aspect, the first orientation calculated by using the gyro sensor is corrected based on the acceleration data. Therefore, an error in the orientation calculated by using the gyro sensor can be corrected, thereby accurately calculating the orientation of the input device by using the gyro sensor. Further, according to the aspect described above, the first orientation is caused to approach the third orientation at a predetermine rate, and therefore, as described above, also in the case described above, it is possible to prevent the first orientation from being abruptly changed. As a result, a user may not feel the operation unnatural due to the first orientation being abruptly changed, thereby enhancing the operability of the input device.

Further, example embodiments of the present invention may be realized as a game apparatus for performing a game process by using, as the orientation of the input device, the first orientation corrected by the orientation calculation apparatus according to the first to the third aspects.

According to the above description, a player of the game is allowed to play a game by using, as a game input, the accurate first orientation corrected based on the acceleration data and an image of the imaging subject to be taken, thereby enhancing the operability of the game operation based on the orientation of the input device.

Further, example embodiments of the present invention may be realized as an orientation calculation program or a game program for causing a computer of an information processing apparatus to function as the respective means described above.

According to example embodiments of the present invention, the orientation calculated by using the gyro sensor is corrected based on the acceleration data and/or an image of the imaging subject to be taken. Therefore, an error in the orientation calculated by the gyro sensor can be corrected, thereby accurately calculating the orientation of the input device by using the gyro sensor.

These and other features, aspects and advantages of the present invention will become more apparent from the following detailed description of example embodiments of the present invention when taken in conjunction with the accompanying drawings.

DESCRIPTION OF THE NON-LIMITING, EXAMPLE EMBODIMENTS

[Entire Structure of Game System]

Figure 1:
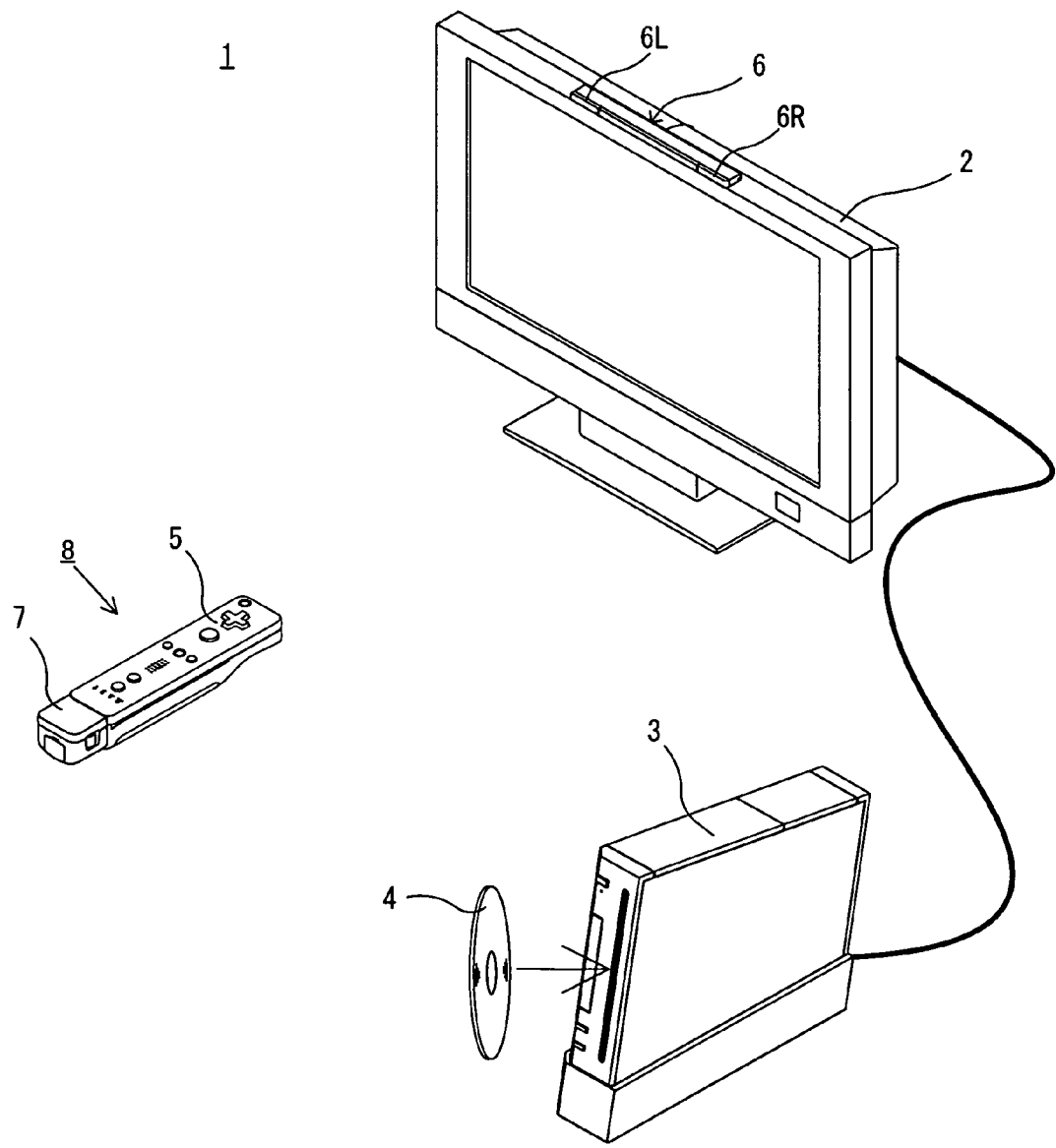
FIG. 1 is an external view of a game system.

With reference to FIG. 1, a game system 1 including a game apparatus typifying an orientation calculation apparatus according to an example embodiment of the present invention will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs game process based on a game operation using the input device 8.

In the game apparatus 3, the optical disc 4 typifying an information storage medium used for the game apparatus 3 in an exchangeable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LED, and emits an infrared light forward from the television 2. The marker section 6 is connected to the game apparatus 3, and the game apparatus 3 is able to control each infrared LED of the marker section 6 so as to light each infrared LED up.

The input device 8 provides the game apparatus 3 with operation data representing a content of an operation performed on the input device 8 itself. In the present embodiment, the input device 8 includes a controller 5 and a gyro sensor unit 7. As described in detail below, the input device 8 is structured such that the gyro sensor unit 7 is detachably connected to the controller 5. Radio communication is made between the controller 5 and the game apparatus 3. In the present embodiment, the radio communication between the controller 5 and the game apparatus 3 is made by using, for example, the Bluetooth (Registered Trademark) technology. In another embodiment, connection between the controller 5 and the game apparatus 3 may be a wired connection.

[Internal Structure of Game Apparatus 3]

Figure 2:
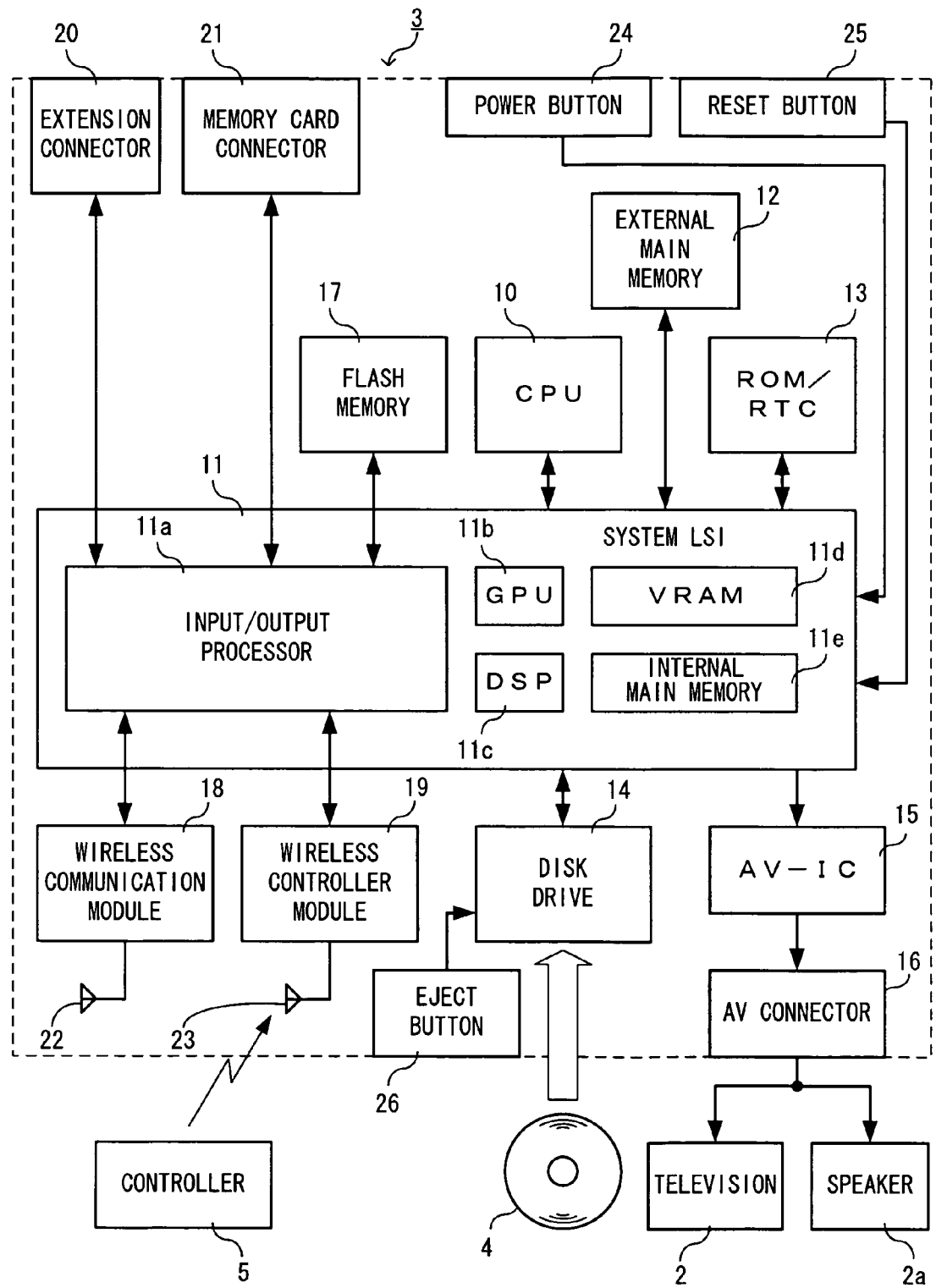
FIG. 2 is a functional block diagram of a game apparatus.

Next, an internal structure of the game apparatus 3 will be described with reference to FIG. 2. FIG. 2 is a block diagram illustrating a structure of the game apparatus 3. The game apparatus 3 includes the CPU 10, a system LSI 11, an external main memory 12, a ROM/RTC 13, a disk drive 14, an AV-IC 15, and the like.

The CPU 10, functioning as a game processor, performs game process by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (so-called a boot ROM) incorporating a boot program for the game apparatus 3, and a clock circuit (RTC: Real Time Clock) for counting a time. The disk drive 14 reads program data, texture data, and the like from the optical disc 4, and writes the read data into an internal main memory 11e or the external main memory 12 described below.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These component 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data by using data stored in the VRAM 11d.

The DSP 11c, functioning as an audio processor, generates audio data by using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the component connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects for data which needs to be transmitted to the network, and transmits, when the data is detected, the data to the network through the wireless communication module 18 and the antenna 22. Further, the input/output processor 11a receives data transmitted from another game apparatus, and/or download data from a download server, through the network, the antenna 22, and the wireless communication module 18, and stores the received data and/or the downloaded data in the flash memory 17. The CPU 10 executes a game program so as to read data stored in the flash memory 17 and use the data on the game program. The flash memory 17 may store saved data (game result data or intermediate step data) of a game played by using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data in a buffer area of the internal main memory 11e or the external main memory 12.

Further, the input/output processor 11a is connected to the extension connector 20 and the memory card connector 21. The extension connector 20 is a connector for interface, such as a USB or a SCSI, and allows communication with the network by connecting thereto a media such as an external storage media, connecting thereto a peripheral device such as another controller, and/or connecting thereto a wired communication connector, without using the wireless communication module 18. The memory card connector 21 is a connector for connecting thereto an external storage media such as a memory card. For example, the input/output processor 11a accesses an external storage media through the extension connector 20 or the memory card connector 21 so as to store data in the external storage media or read data from the external storage media.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

[Structure of Input Device 8]

Figure 3:
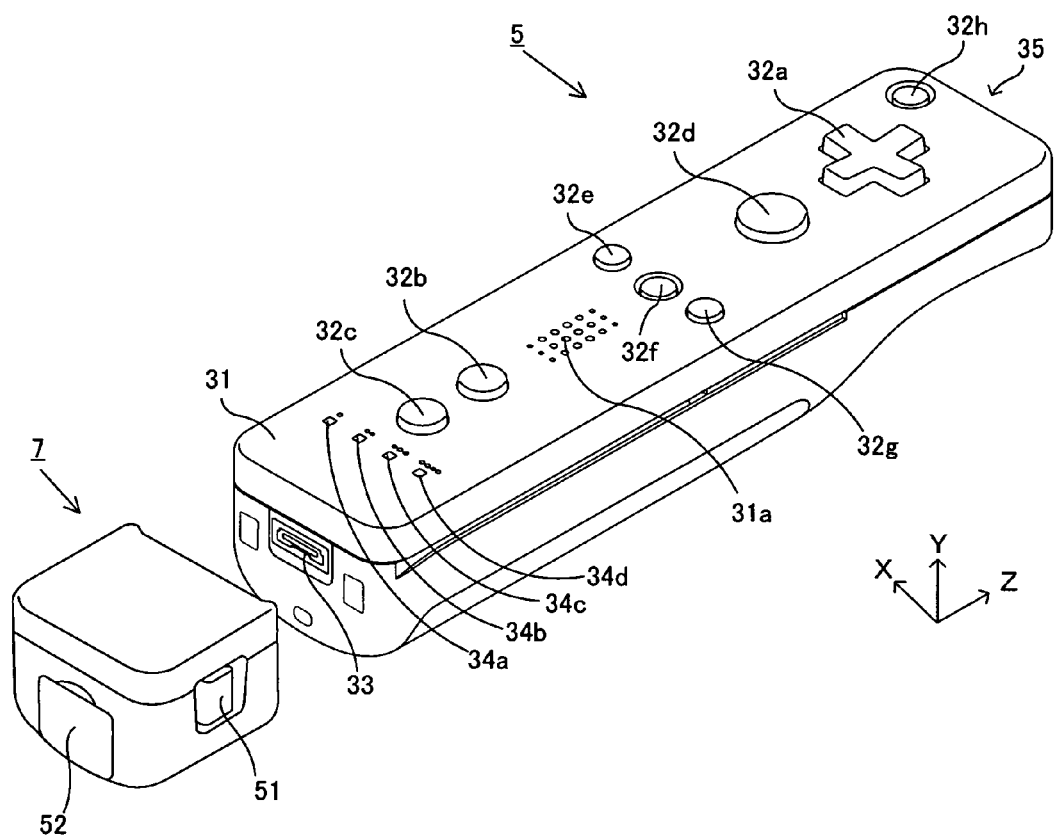
FIG. 3 is a perspective view illustrating an external structure of an input device.
Figure 4:
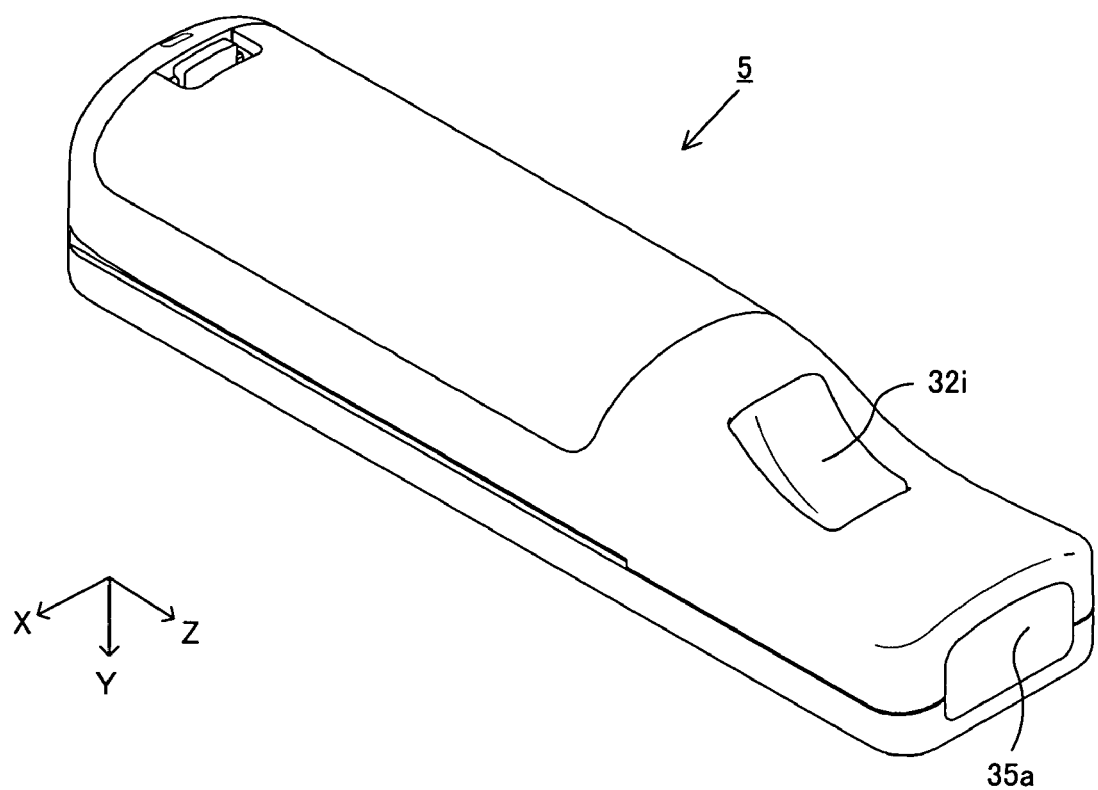
FIG. 4 is a perspective view illustrating an external structure of a controller.

Next, with reference to FIGS. 3 to 6, the input device 8 will be described. FIG. 3 is a perspective view illustrating an external structure of an input device 8. FIG. 4 is a perspective view illustrating an external structure of the controller 5. FIG. 3 is a perspective view illustrating the controller 5 as viewed from the top rear side thereof, and FIG. 4 is a perspective view illustrating the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and the entire housing 31 has such a size as to be able to be held by one hand of an adult or even a child. A player is allowed to perform game operation by pressing buttons provided on the controller 5, and moving the controller 5 so as to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In example embodiments of the present invention, the top surface of the housing 31 on which the buttons 32a to 32h are provided may be referred to as a "button surface". On the other hand, as shown in FIG. 4, a recessed portion is formed on a bottom surface of the housing 31, and a B button 32i is provided on a rear slope surface of the recessed portion. The operation buttons 32a to 32i are assigned, as necessary, with respective functions in accordance with the game program executed by the game apparatus 3. Further, the power button 32h remote-controls the power of a body of the game apparatus 3 to be on or off. The home button 32f and the power button 32h each have the top surface thereof buried in the top surface of the housing 31. Therefore, the home button 32f and the power button 32h are prevented from being inadvertently pressed by the player.

On a rear surface of the housing 31, the connector 33 is provided. The connector 33 is used for connecting the controller 5 to another device (for example, the gyro sensor unit 7 or another controller). Both side surfaces of the connector 33 provided on the rear surface of the housing 31 each has a fastening hole 33a for preventing easy removal of another device as described above.

In the rear portion on the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing a player of the controller type which is currently set to controller 5 that he or she is using, and for informing a player of remaining battery power of the controller 5, for example. Specifically, when a game operation is performed by using the controller 5, one of the plurality of LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of material passing therethrough at least infrared light outputted from the markers 6R and 6L.

On the top surface of the housing 31, a sound hole 31a for externally outputting a sound from a speaker 49 (shown in FIG. 5) which is incorporated in the controller 5 is provided between the first button 32b and the home button 32f.

Figure 5:
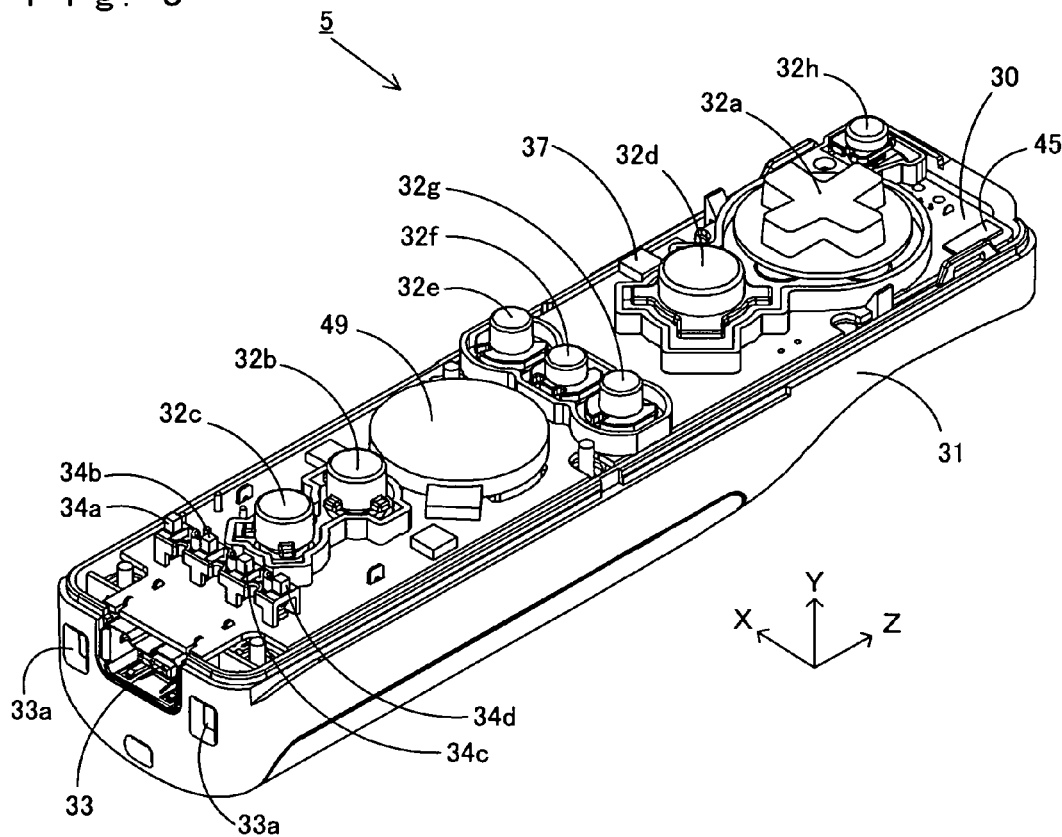
FIG. 5 is a diagram illustrating an internal structure of the controller.
Figure 6:
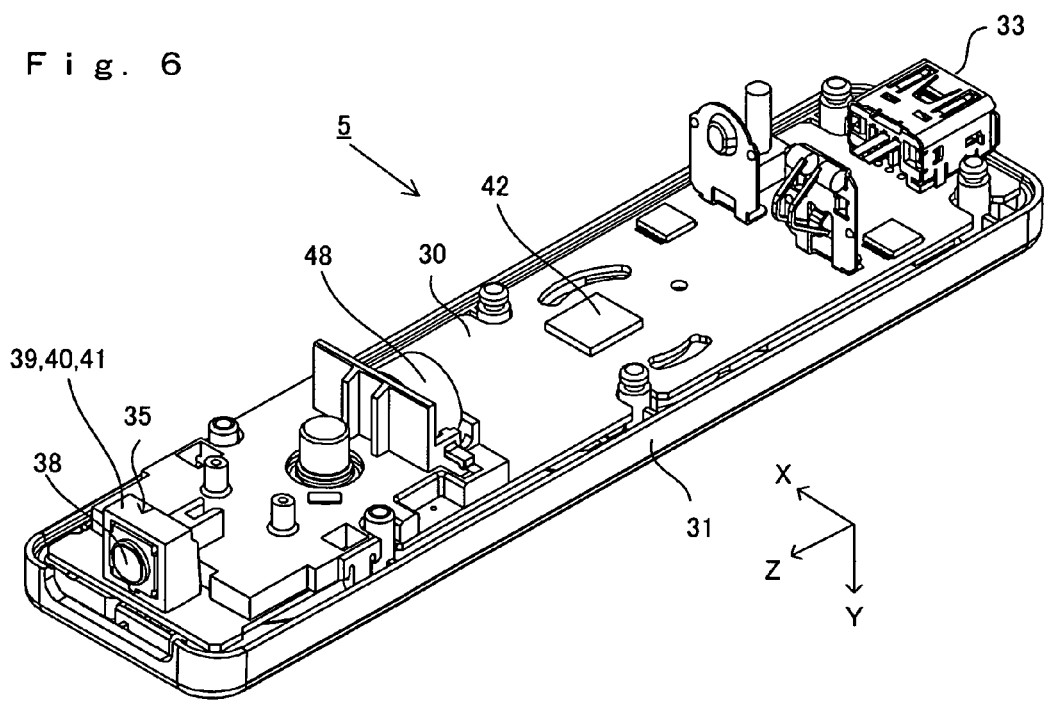
FIG. 6 is a diagram illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. FIG. 6 is a perspective view illustrating a reverse side of a substrate 30 shown in FIG. 5.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided in front of the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, the image pickup element 40 and an image processing circuit 41 located in order, respectively, from the front surface of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by an actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned at the end portion of the controller 5 offset from the center thereof, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyro sensor unit 7 includes a gyro sensor (gyro sensors 55 and 56 shown in FIG. 7) for detecting for angular rates around three axes, respectively. The gyro sensor unit 7 is detachably mounted to the connector 33 of the controller 5. The gyro sensor unit 7 has, at the front edge (an edge portion facing toward the Z-axis positive direction shown in FIG. 3), a plug (a plug 53 shown in FIG. 7) connectable to the connector 33. Further, the plug 53 has hooks (not shown) on both sides, respectively. In a state where the gyro sensor unit 7 is mounted to the controller 5, the plug 53 is connected to the connector 33, and the hooks engage in the fastening holes 33a, respectively, of the controller 5. Therefore, the controller 5 and the gyro sensor unit 7 are securely fixed to each other. Further, the gyro sensor unit 7 has a button 51 on each side surface (surfaces facing toward the X-axis direction shown in FIG. 3). When the button 51 is pressed, the hook is disengaged from the fastening hole 33a. Therefore, when the plug 53 is removed from the connector 33 while the button 51 is being pressed, the gyro sensor unit 7 can be disconnected from the controller 5.

Further, a connector having the same shape as the connector 33 is provided at the rear edge of the gyro sensor unit 7. Therefore, another device which can be mounted to (the connector 33 of) the controller 5 can be mounted to the connector of the gyro sensor unit 7. In FIG. 3, a cover 52 is detachably provided over the connector.

FIGS. 3 to 6 each show only examples of a shape of each of the controller 5 and the gyro sensor unit 7, a shape of each operation button, the number of acceleration sensors, the number of vibrators, positions at which the acceleration sensor and the vibrator, respectively, are provided, and the like. Example embodiments of the present invention can be realized when shapes of the controller 5, the gyro sensor unit 7, and the operations buttons, the number of acceleration sensors, the number of vibrators, positions at the acceleration sensors and the vibrators, respectively, are provided are other than those shown in FIGS. 3 to 6. Further, although in the present embodiment the imaging direction of the image pickup means is Z-axis positive direction, the imaging direction may be any direction. That is, the imagining information calculation section 35 (the light incident surface 35a through which a light is incident on the imaging information calculation section 35) of the controller 5 may not be provided on the front surface of the housing 31, but may be provided on any other surface on which a light can be received from the outside of the housing 31.

Figure 7:
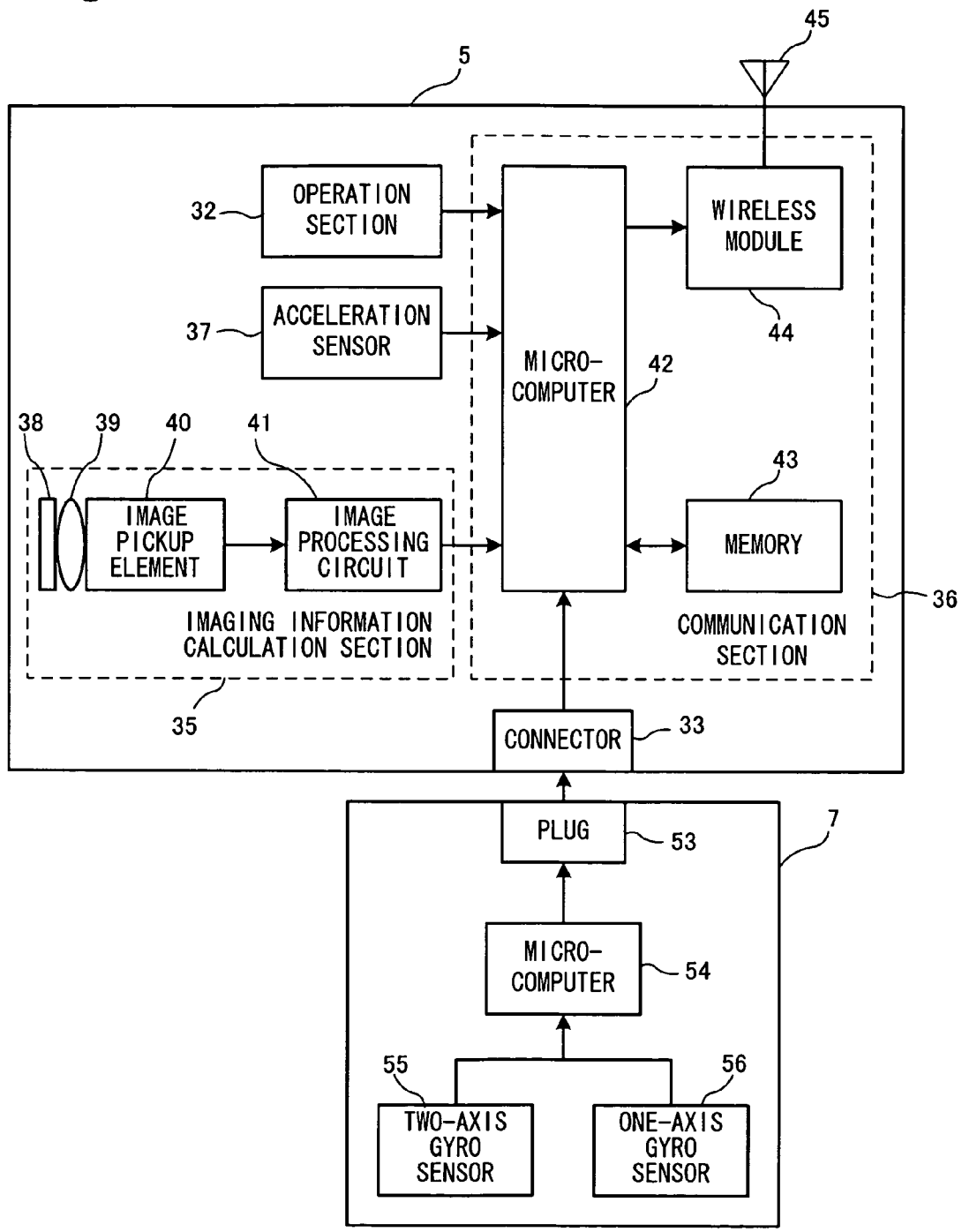
FIG. 7 is a block diagram illustrating a structure of the input device.

FIG. 7 is a block diagram illustrating a structure of the input device 8 (the controller 5 and the gyro sensor unit 7). The controller 5 includes an operation section 32 (the respective operation buttons 32a to 32i), the connector 33, the imaging information calculation section 35, a communication section 36, and the acceleration sensor 37. The controller 5 transmits, as operation data, data representing a content of operation performed on the controller 5 itself, to the game apparatus 3.

The operation section 32 includes the operation buttons 32a to 32i described above, and outputs, to the microcomputer 42 of a communication section 36, operation button data indicating an input state (that is, whether or not each operation button 32a to 32i is pressed) of each operation button 32a to 32i.

The imaging information calculation section 35 is a system for analyzing image data taken by the image pickup means and calculating the centroid, the size and the like of an area having a high brightness in the image data. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 allows only infrared light to pass therethrough, among light incident on the front surface of the controller 5. The lens 39 collects the infrared light which has passed through the infrared filter 38 so as to be incident on the image pickup element 40. The image pickup element 40 is a solid-state imaging device such as, for example, a CMOS sensor or a CCD sensor, and receives the infrared light collected by the lens 39, and outputs an image signal. The markers 6R and 6L of the marker section 6 provided near the display screen of the television 2 each include an infrared LED for outputting an infrared light forward from the television 2. Therefore, the infrared filter 38 enables the image pickup element 40 to receive only the infrared light which has passed through the infrared filter 38 and generate image data, so that an image of each of the markers 6R and 6L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, a position of an imaging subject (the marker 6R and the marker 6L). The image processing circuit 41 outputs data representing a coordinate point of the calculated position, to the microcomputer 42 of the communication section 36. The data representing the coordinate point is transmitted as operation data to the game apparatus 3 by the microcomputer 42. Hereinafter, the coordinate point is referred to as a "marker coordinate point". The marker coordinate point changes depending on an orientation (angle of tilt) and/or a position of the controller 5 itself, and therefore the game apparatus 3 is allowed to calculate the orientation and the position of the controller 5 by using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects for an acceleration (including gravitational acceleration) of the controller 5, that is, detects for a force (including gravity) applied to the controller 5. The acceleration sensor 37 detects a value of an acceleration (linear acceleration) in the straight line direction along the sensing axis direction, among accelerations applied to a detection section of the acceleration sensor 37. For example, multi axial acceleration sensor having two or more axes detects an acceleration of a component for each axis, as an acceleration applied to the detection section of the acceleration sensor. For example, three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects for a linear acceleration in three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects for an acceleration for the straight line direction along each axis, and an output from the acceleration sensor 37 represents a value of the linear acceleration for each of the three axes. In other words, the detected acceleration is represented as a three-dimensional vector (ax, ay, az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector.

Data (acceleration data) representing an acceleration detected by the acceleration sensor 37 is outputted to the communication section 36. The acceleration detected by the acceleration sensor 37 changes depending on an orientation (angle of tilt) and the movement of the controller 5, and therefore the game apparatus 3 is allowed to calculate the orientation and the movement of the controller 5 by using the acceleration data. In the present embodiment, the game apparatus 3 determines the orientation of the controller 5 based on the acceleration data.

The data (acceleration data) representing the acceleration (acceleration vector) detected by the acceleration sensor 37 is outputted to the communication section 36. In the present embodiment, the acceleration sensor 37 is used as a sensor for outputting data for determining the angle of tilt of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, a case where the computer performs process when it is anticipated that the controller 5 including the accelerate sensor 37 is in a static state (that is, a case where process is performed when it is anticipated that an acceleration detected by the acceleration sensor will include only a gravitational acceleration) will be described. When the controller 5 is actually in the static state, it is possible to determine whether or not the controller 5 tilts relative to the direction of gravity and to also determine a rate of the tilt, based on the acceleration having been detected. Specifically, when a state where a detection axis of the acceleration sensor 37 is toward the vertically downward direction represents a reference, whether or not the controller 5 tilts relative to the reference can be determined based on whether or not 1G (gravitational acceleration) is applied to the detection axis, and a degree to which the controller 5 tilts relative to the reference can be determined based on the magnitude of the gravitational acceleration. Further, the multi axial acceleration sensor 37 subjects, to a processing, the acceleration signals having been detected in the respective axes so as to more specifically determine the degree to which the controller 5 tilts relative to the direction of gravity. In this case, the processor may calculate, based on the output from the acceleration sensor 37, an angle of the tilt at which the controller 5 tilts, or calculate direction in which the controller 5 tilts without calculating the angle of the tilt. Thus, when the acceleration sensor 37 is used in combination with the processor, an angle of tilt or an orientation of the controller 5 may be determined.

On the other hand, in a case where it is anticipated that the controller 5 will be in a dynamic state (a state where the controller 5 is being moved), the acceleration sensor 37 detects for an acceleration based on a movement of the controller 5, in addition to the gravitational acceleration. Therefore, when the gravitational acceleration component is eliminated from the detected acceleration through a predetermined process, it is possible to determine a direction in which the controller 5 moves. Even when it is anticipated that the controller 5 will be in the dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing, before outputting to the microcomputer 42 an acceleration signal detected by the acceleration detection means incorporated therein, any desired processing of the acceleration signal. For example, when the acceleration sensor 37 is intended to detect static acceleration (for example, gravitational acceleration), the embedded or dedicated processor could convert the acceleration signal to a corresponding angle of tilt (or another preferable parameter).

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyro sensor unit 7 is inputted to the microcomputer 42 through the connector 33. Hereinafter, a structure of the gyro sensor unit 7 will be described.

The gyro sensor unit 7 includes the plug 53, a microcomputer 54, the two-axis gyro sensor 55, and the one-axis gyro sensor 56. As described above, the gyro sensor unit 7 detects for angular rates around three axes (XYZ axes in the present embodiment), respectively, and transmits data (angular rate data) representing the detected angular rates, to the controller 5.

The two-axis gyro sensor 55 detects for an angular rate (per unit time) around each of the X-axis and the Y-axis. Further, the one-axis gyro sensor 56 detects for an angular rate (per unit time) around the Z-axis. In example embodiments of the present invention, directions of the rotations around the X-axis, the Y-axis, and the Z-axis relative to the imaging direction (the Z-axis positive direction) of the controller 5 are referred to as a roll direction, a pitch direction, and a yaw direction, respectively. That is, the two-axis gyro sensor 55 detects for angular rates in the roll direction (direction of rotation around the X-axis) and the pitch direction (direction of rotation around the Y-axis), and the one-axis gyro sensor 56 detects for an angular rate in the yaw direction (the direction of rotation around the Z-axis).

In the present embodiment, the two-axis gyro sensor 55 and the one-axis gyro sensor 56 are used so as to detect for the angular rates around the three axes. However, in another embodiment, the number of gyro sensors and a combination thereof to be used maybe optionally selected when the number of gyro sensors and the combination thereof to be used enable detection of the angular rates around the three axes.

Further, in the present embodiment, the three axes around which the gyro sensors 55 and 56 detect for the angular rates are set to correspond to three axes (XYZ-axes), respectively, for which the acceleration sensor 37 detects for the accelerations, such that the calculation in the orientation calculation process described below is facilitated. However, in another embodiment, the three axes around which the gyro sensors 56 and 57 detect for the angular rates may not correspond to the three axes for which the acceleration sensor 37 detects for the accelerations.

Data representing the angular rates detected by the gyro sensors 56 and 57 are outputted to the microcomputer 54. Therefore, data representing the angular rates around the three axes of the X, Y, and Z axes are inputted to the microcomputer 54. The microcomputer 54 transmits the data representing the angular rates around the three axes, as angular rate data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operation section 32, the imaging information calculation section 35, and the acceleration sensor 37 to the microcomputer 42, and data transmitted from the gyro sensor unit 7 to the microcomputer 42 are temporarily stored in the memory 43. The data are transmitted as the operation data to the game apparatus 3. At a timing of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

When the controller 5 is used, a player is allowed to not only perform a conventional typical game operation of pressing the respective operation buttons, but also to perform an operation of tilting the controller 5 at a desired angle of tilt. Other than these operations, by using the controller 5, a player is allowed to perform an operation of designating a desired position on a screen, or perform an operation of moving the controller 5 itself.

[Outline of Orientation Calculation Process]

Next, an outline of an orientation calculation process performed by the game apparatus 3 for calculating an orientation of the input device 8 will be described with reference to FIGS. 8 to 12. In the present embodiment, the game apparatus 3 acquires data (operation data) from the input device 8 including the gyro sensors 55 and 56, the acceleration sensor 37, and image pickup means (the image pickup element 40), so as to calculate an orientation of the input device 8. In the present embodiment, the input device 8 includes both the acceleration sensor 37 and the image pickup element 40. However, in another embodiment, the input device 8 may include one of the acceleration sensor 37 or the image pickup element 40.

The game apparatus 3 includes (1) orientation calculation means, (2) first correction means, and (3) second correction means. In the present embodiment, the game program (the orientation calculation program) executed by a computer (the CPU 10) of the game apparatus 3 causes the computer to function as each means, thereby realizing each means. In another embodiment, some or all of the aforementioned means may be realized as dedicated circuits of the game apparatus 3.

(1) Orientation Calculation Means

The orientation calculation means calculates an orientation of the input device 8 based on angular rates detected by the gyro sensors 55 and 56 (step S4 described below). The orientation may be calculated based on the angular rates in any manner. For example, a manner in which each angular rate (per unit time) is sequentially added to an initial orientation may be used. Specifically, each angular rate which is sequentially outputted from the gyro sensors 55 and 56 is integrated so as to calculate, from the result of the integration, an amount of change from an orientation in the initial state, so that a current orientation can be calculated. Hereinafter, the orientation of the input device 8 calculated by the orientation calculation means based on the angular rates is referred to as a "first orientation". Note that an orientation obtained by correcting the first orientation is also referred to as the first orientation.

Erroneous detection made by the gyro sensors 55 and 56 may cause an error between the first orientation calculated based on the angular rates detected by the gyro sensors 55 and 56 and an actual orientation of the input device 8. In the present embodiment, the game apparatus 3 corrects the first orientation by using an acceleration detected by the acceleration sensor 37. Further, the first orientation is corrected by using an image (pickup image) taken by the image pickup element 40.

(2) First Correction Means

The first correction means corrects the first orientation based on the acceleration data detected by the acceleration sensor 37 (step S5 described below). In the present embodiment, the first correction means corrects the first orientation so as to approach a second orientation. Here, the second orientation represents an orientation determined based on the acceleration data, and specifically the second orientation represents an orientation of the input device 8 obtained based on the assumption that the direction of an acceleration represented by the acceleration data is the vertically downward direction. That is, the second orientation represents an orientation calculated based on an assumption that the acceleration represented by the acceleration data is the gravitational acceleration. Hereinafter, a correction process (first correction process) performed by the first correction means will be described with reference to FIGS. 8 to 10.

Figure 8A:
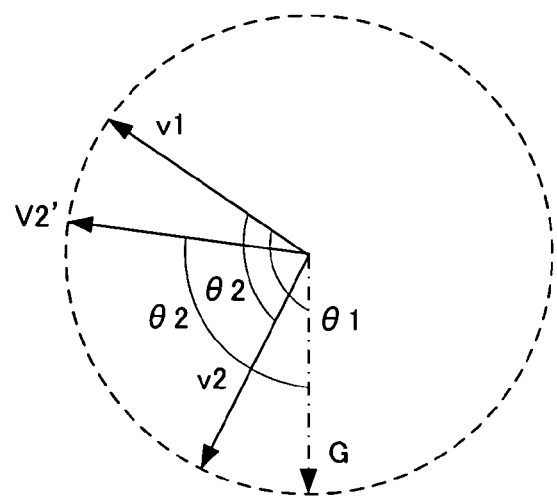
FIGS. 8A and 8B are diagrams illustrating vectors representing a first orientation and a second orientation.
Figure 8B:
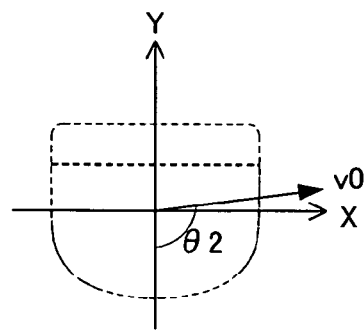

FIG. 8A and FIG. 8B are diagrams illustrating the correction of the first orientation performed by using the second orientation. Although an orientation is actually processed in a three-dimensional space, a case where an orientation is processed on a two-dimensional plane will be described with reference to FIGS. 8 to 10 in the present embodiment for making the drawings easily understandable. A vector G shown in FIG. 8A represents the vertically downward direction defined in a space coordinate system having, as an originating point, a predetermined position in a space including the input device 8, that is, represents the direction of gravity. Further, a vector v1 shown in FIG. 8A represents a direction, in the space coordinate system, of a vector representing the downward direction (that is, the Y-axis negative direction shown in FIGS. 3 to 5) of the input device 8 when the controller 5 is in the first orientation. When the input device 8 is in a reference orientation, the vector representing the orientation coincides with the vector G. Therefore, the vector v1 represents the first orientation in the space coordinate system. The first orientation may be also represented as a rotation of the vector v1 relative to the vector G, and is represented as an angle θ 1 on the two-dimensional plane shown in FIG. 8A. The first orientation is calculated based on an angular rate, and therefore the vector v1 is calculated by rotating the immediately preceding orientation by the angular rate. The second orientation is calculated based on the acceleration data. The vector v2 shown in FIG. 8A represents a direction (a direction of an acceleration in a view coordinate system) of an acceleration represented by the acceleration data. The acceleration data represents an acceleration applied to the input device 8, and is obtained as a vector in a coordinate system defined for the input device 8. FIG. 8B shows a relationship between axes of the acceleration sensor and an acceleration vector. As shown in FIG. 8B, when θ 2 represents an angle between an acceleration vector v0 obtained from the acceleration sensor and the Y-axis negative direction of the sensor, the vector v2 obtained by rotating the vector v1 by θ 2 is an acceleration vector in the space coordinate system shown in FIG. 8A. The second orientation is "an orientation of the input device 8 obtained based on the assumption that the direction of an acceleration represented by the acceleration data is the vertically downward direction" as describe above. Therefore, the rotation of an angle θ 2 from the vector v2 to the vector v1 represents the second orientation. When the second orientation is to be represented, like the vector v1, as a vector representing the downward direction of the input device 8 in the space coordinate system, the second orientation can be represented as the vector v2' obtained by rotating the vector G by θ 2. Further, when the second orientation is to be represented as a three-dimensional orientation, the second orientation may be represented as a three-dimensional rotation matrix, or the like. When the first orientation is accurately calculated based on the angular rate, and the acceleration data accurately represents the direction of gravity, the direction of the vector v2 representing the direction of the acceleration coincides with the vertically downward direction in the space coordinate system, that is, the direction of gravity. In other words, when the first orientation is not accurately calculated based on the angular rate, and/or when the acceleration data does not accurately represent the direction of gravity, the vector v2 representing the direction of the acceleration does not coincide with the vector G representing the direction of gravity as shown in FIG. 8A. For example, in the static state, such as, in a state where it is anticipated that the direction represented by the acceleration data coincides with the direction of gravity, the vector v2 may represent data corresponding to the orientation of the input device 8 more accurately than the vector v1. Further, also in a case where the input device is not in the static state, when the orientations obtained in some time periods are averaged, the acceleration vectors represent almost the direction of gravity on average, and therefore the orientation based on the acceleration vector is more reliable than the orientation which is calculated based on the angular rate and includes accumulated error over the passage of time. On the other hand, when the orientation has been accurately calculated in the immediately preceding calculation, the orientation may be calculated by using the angular rate more accurately than by using the acceleration in the following calculation. Specifically, although an error, for each calculation, in the orientation calculated based on the angular rate is smaller than that in the orientation calculated based on the acceleration, the error in orientation calculated based on the angular rate is increased over the passage of time. On the other hand, when the orientation is calculated based on the acceleration, an error for each calculation may be increased in some cases but the orientation can be independently calculated in each calculation, and the error is not accumulated. Therefore, the first correction means makes correction by using both the first orientation and the second orientation.

Figure 9:
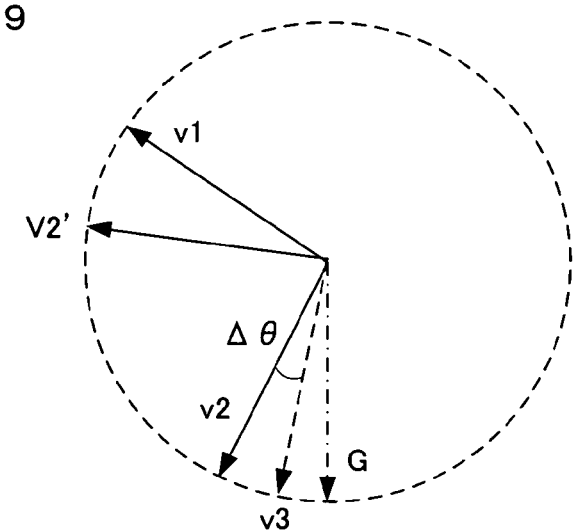
FIG. 9 is a diagram illustrating a vector v3 representing an amount of correction.

The first correction means corrects the first orientation so as to approach the second orientation. Specifically, the first correction means makes correction such that the angle θ 1 approaches the angle θ 2. This correction can be regarded as a correction in which the vector v1 approaches the vector v2'. However, in a case where the vector v2 has been obtained in the calculation process, even when the vector v2' is not calculated, the correction can be made. In the present embodiment, the correction is made by using a vector v3 representing an amount of correction. FIG. 9 is a diagram illustrating the vector v3 representing an amount of correction. The vector v3 shown in FIG. 9 is a vector representing an amount of correction used for correcting the first orientation. Specifically, an angle Δ θ between the vector v2 and the vector v3 represents the amount of correction. The vector v3 is set between the vector G and the vector v2 as described below in detail (see FIG. 9). The vector v1 approaches the vector v2' by rotating the vector v1 by Δ θ.

Figure 10:
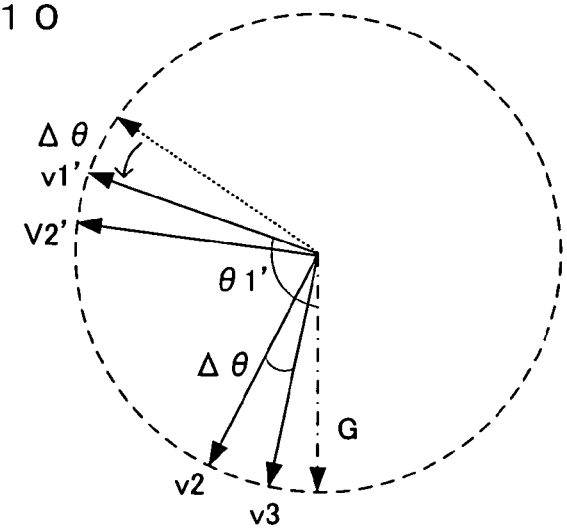
FIG. 10 is a diagram illustrating a vector representing the first orientation corrected in a first correction process.

The first correction process is performed by rotating the first orientation (the vector v1) by the amount of correction. FIG. 10 is a diagram illustrating a vector representing the first orientation corrected in the first correction process. As shown in FIG. 10, the corrected first orientation (the vector v1') is obtained by rotating the uncorrected first orientation (the vector v1) by the angle Δ θ. Thus, the angle θ 1' representing the corrected first orientation is between the angle θ 1 and the angle θ 2, and it is indicated that the correction in which the angle θ 1 approaches the angle θ 2 is made.

In the present embodiment, although the first correction means makes the correction in which the first orientation approaches the second orientation, the corrected first orientation does not coincide with the second orientation. This is because when the acceleration data is rapidly changed due to erroneous detection, vigorous operation, or the like, the first orientation is prevented from being corrected so as to abruptly change. However, in another embodiment, the first correction means may make correction in which the corrected first orientation coincides with the second orientation. Further, in the present embodiment, a rate at which the first orientation approaches the second orientation by using the first correction means is determined depending on a magnitude of an acceleration represented by the acceleration data (more specifically, a difference between the magnitude of gravitational acceleration and the magnitude of the acceleration represented by the acceleration data), as described below in detail. However, in another embodiment, the rate may be a predetermined fixed value.

(3) Second Correction Means

The second correction means corrects the first orientation based on an image of a predetermined subject to be taken by the image pickup means (step S6 described below). In the present embodiment, the predetermined subject is the marker section 6 (the infrared LEDs thereof). In the present embodiment, the second correction means corrects the first orientation so as to approach the third orientation. The third orientation is an orientation calculated based on the image of the predetermined subject, and, specifically, the third orientation is an orientation of the input device 8, which is calculated based on a direction and/or a position of the predetermined subject in the image. Hereinafter, the correction process (the second correction process) made by the second correction means will be described with reference to FIG. 11 and FIG. 12.

Figure 11:
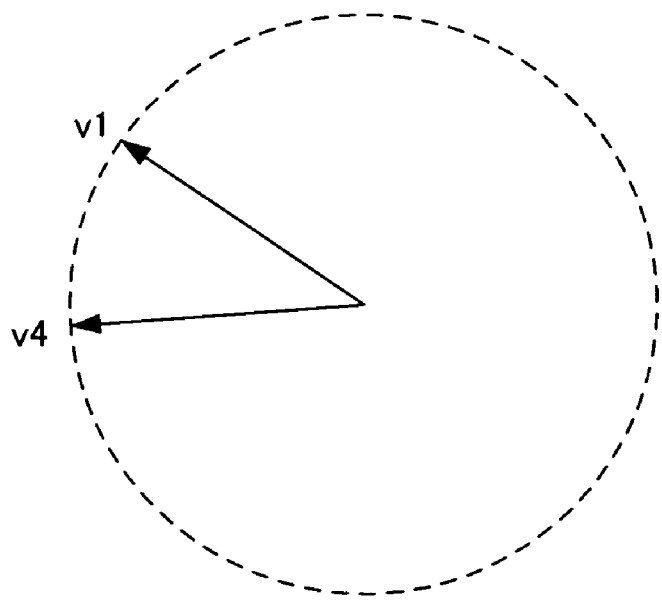
FIG. 11 is a diagram illustrating vectors representing the first orientation and a third orientation.

FIG. 11 is a diagram illustrating correction of the first orientation made by using the third orientation. Although the orientation is actually processed in the three-dimensional space, a case where the orientation is processed on the two-dimensional plane will be described in the present embodiment with reference to FIGS. 11 and 12 for making the drawings easily understandable. A vector v1 shown in FIG. 11 represents the first orientation in the space coordinate system. A vector v4 shown in FIG. 11 represents the third orientation in the space coordinate system. The position and the orientation of the marker section 6 are previously set, and therefore the orientation of the input device 8 can be calculated relative to the orientation and the position of the marker in the image. Assuming that the third orientation is accurately obtained, when the first orientation is accurately calculated based on an angular rate, the vector v1 representing the first orientation coincides with the vector v4 representing the third orientation. That is, when the first orientation is not accurately calculated based on an angular rate, the vector v1 representing the first orientation does not coincide with the vector v4 representing the third orientation as shown in FIG. 11.

Figure 12:
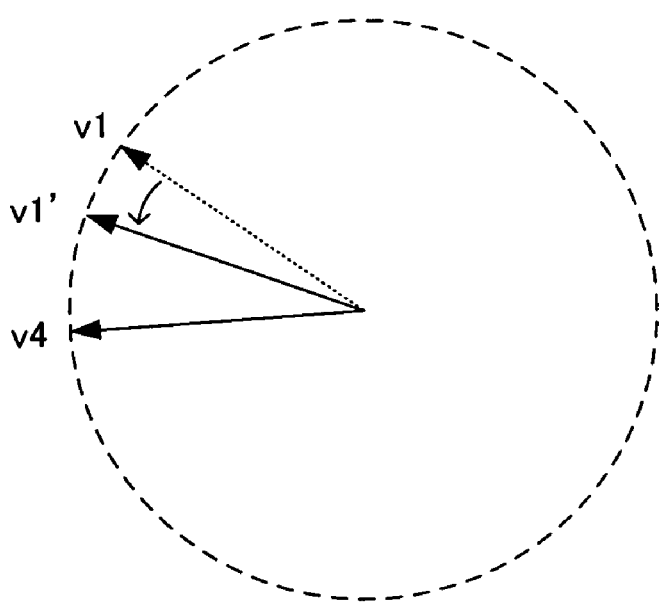
FIG. 12 is a diagram illustrating the first orientation corrected in a second correction process.

In the second correction process, the first orientation (the vector v1) approaches the third orientation (the vector v4) at a predetermined rate. FIG. 12 is a diagram illustrating the first orientation corrected in the second correction process. As shown in FIG. 12, the corrected first orientation (the vector v1') is obtained by the uncorrected first orientation (the vector v1) approaching the third orientation (the vector v4) at a predetermined rate.

The image pickup means may not take an image of the marker section 6 depending on an orientation and/or a position of the input device 8, and, in this case, the second correction means is not allowed to perform the second correction process. If the second correction means corrects the first orientation so as to coincide with the third orientation, when a state in which the second correction process is not allowed to be performed shifts to a state where the second correction process is allowed to be performed, the first orientation may be abruptly changed. When the first orientation is abruptly changed regardless of a player's intention as described above, the player may feel the operation unnatural (even if the orientation has been accurately corrected). In order to prevent the abrupt change, in the present embodiment, the first orientation is corrected so as to approach the third orientation at a predetermined rate. Thus, the abrupt change of the first orientation can be prevented, and therefore a player may not feel the operation unnatural. However, when, for example, it is anticipated that the input device 8 is used in an orientation in which the image pickup means is always allowed to take an image of the marker section 6, the second correction means may correct the first orientation so as to coincide with the third orientation in another embodiment.

Although in the present embodiment the game apparatus 3 performs both the first correction process and the second correction process, the game apparatus 3 may perform one of the first correction process or the second correction process in another embodiment. Further, although in the present embodiment the game apparatus 3 firstly performs the first correction process, and subsequently performs the second correction process, the game apparatus 3 may firstly perform the second correction process, and subsequently perform the first correction process.

As describe above, in the present embodiment, an orientation of the input device 8 which is calculated based on angular rates detected by the gyro sensors 55 and 56 is corrected by using an acceleration detected by the acceleration sensor 37, and further is corrected by using the pickup image taken by the image pickup means. Thus, an error in an orientation calculated by the gyro sensor can be reduced, and the orientation of the input device 8 can be calculated with enhanced accuracy.

A rotation (rotation in the yaw direction) around the direction of gravity is not allowed to be detected from a detection result from the acceleration sensor 37, and therefore the first correction means is not able to make correction associated with the yaw direction. However, the correction based on the detection result from the acceleration sensor 37 is advantageous in that the correction can be made in any orientation of the input device 8 (because the acceleration can be always detected). On the other hand, when the marker section 6 is not positioned in the direction in which the input device 8 is allowed to take an image, the marker coordinate point is not detected, and therefore the second correction means may not make the correction depending on the orientation of the input device 8. However, the correction using the pickup image is advantageous in that the accurate calculation of the orientation (particularly, the orientation associated with the roll direction) can be made. In the present embodiment, two types of corrections having the advantages different from each other enable an orientation of the input device 8 to be calculated with enhanced accuracy.

[Detailed Process Performed by Game Apparatus 3]

Figure 13:
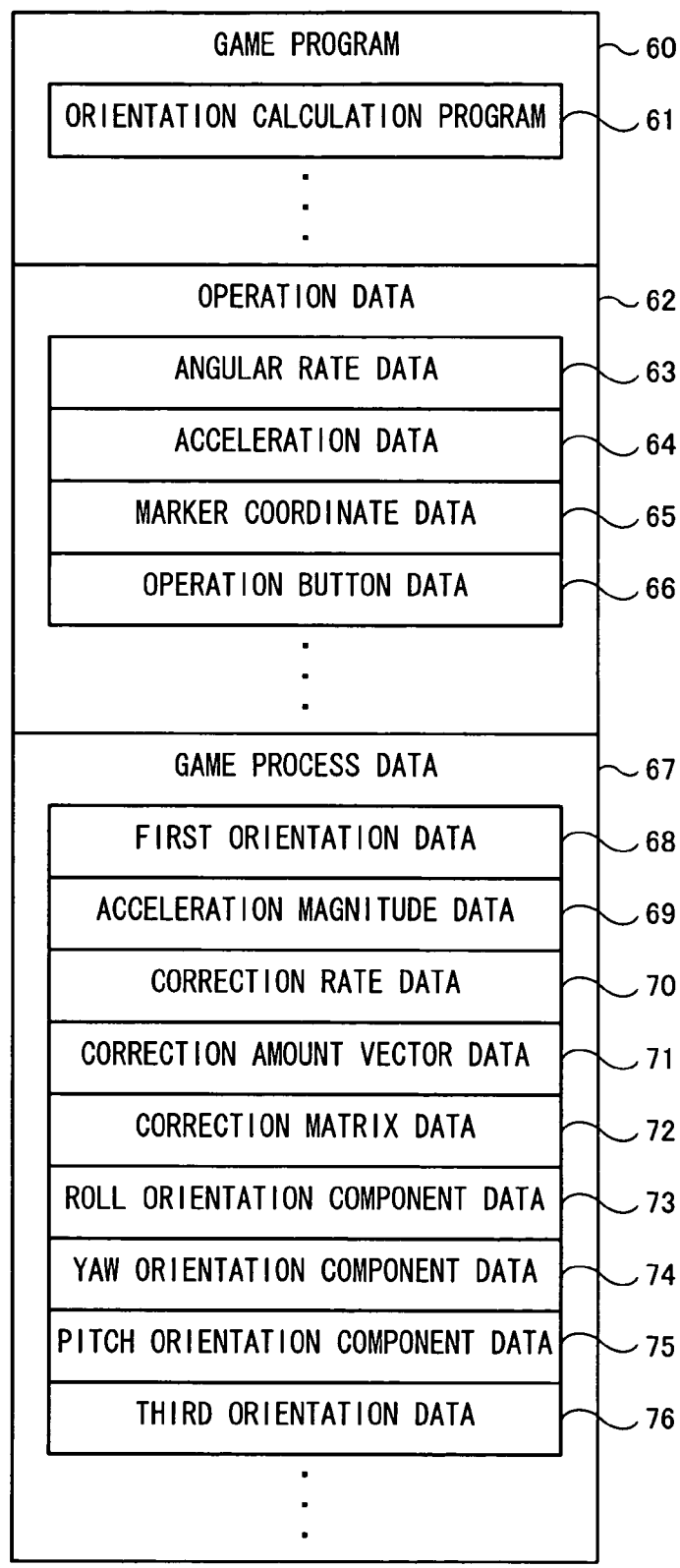
FIG. 13 is a diagram illustrating main data to be stored in a main memory of the game apparatus.

Next, the process performed by the game apparatus 3 will be described in detail. Firstly, main data used in the process performed by the game apparatus 3 will be described with reference to FIG. 13. FIG. 13 is a diagram illustrating main data to be stored in the main memory (the external main memory 12 or the internal main memory 11*e*) of the game apparatus 3. As shown in FIG. 13, a game program 60, operation data 62, and game process data 67 are stored in the main memory of the game apparatus 3. In addition to the data shown in FIG. 13, data necessary for game process, such as image data of various objects appearing in a game, data representing various parameters of the objects, and the like, are stored in the main memory.

A part or all of the game program 60 are read from the optical disc 4 and stored in the main memory at an appropriate time after the game apparatus 3 is powered on. The game program 60 includes an orientation calculation program 61. The orientation calculation program 61 is a program for performing the orientation calculation process for calculating an orientation of the input device 8.

The operation data 62 is operation data transmitted from the controller 5 to the game apparatus 3. As describe above, the operation data is transmitted from the controller 5 to the game apparatus 3 at intervals of 1/200 seconds, and the operation data 62 stored in the main memory is updated at the same intervals. In the present embodiment, only the latest operation data (having been most recently obtained) may be stored in the main memory.

The operation data 62 includes angular rate data 63, acceleration data 64, marker coordinate data 65, and operation button data 66. The angular rate data 63 is data representing angular rates detected by the gyro sensors 55 and 56 of the gyro sensor unit 7. The angular rate data 63 represents the angular rates around three axes, that is, the X-axis, the Y-axis, and the Z-axis shown in FIG. 3. Further, the acceleration data 64 is data representing an acceleration (acceleration vector) detected by the acceleration sensor 37. The acceleration data 64 represents a three-dimensional acceleration vector Va1 having components of accelerations associated with the directions of three axes, that is, the X-axis, the Y-axis, and the Z-axis shown in FIG. 3. Further, in the present embodiment, a magnitude of the acceleration vector Va1 which is detected by the acceleration sensor 37 when the controller 5 is in a static state is "1". That is, the magnitude of the gravitational acceleration detected by the acceleration sensor 37 is "1".

The marker coordinate data 65 represents a coordinate point calculated by the image processing circuit 41 of the imaging information calculation section 35, that is, data representing the marker coordinate point. The marker coordinate point is based on a two-dimensional coordinate system (x'y'-coordinate system shown in FIG. 17) for representing, on the plane, a position corresponding to the pickup image. When images of two markers 6R and 6L are taken by the image pickup element 40, two marker coordinate points are calculated. On the other hand, when one of the marker 6R or the marker 6L is positioned in a range in which the image pickup element 40 is allowed to take an image, the image pickup element 40 takes an image of one marker, and only one marker coordinate point is calculated. Further, when neither the marker 6R nor the marker 6L is positioned in the range in which the image pickup element 40 is allowed to take an image, the image pickup element 40 does not take an image of the marker, and the marker coordinate point is not calculated. Therefore, the marker coordinate data 65 may represent two marker coordinate points, one marker coordinate point, or no marker coordinate point.

The operation button data 66 is data representing an input state of each of the operation buttons 32a to 32i.

The game process data 67 is data used for a game process (FIG. 14) described below. The game process data 67 includes first orientation data 68, acceleration magnitude data 69, correction rate data 70, correction amount vector data 71, correction matrix data 72, roll orientation component data 73, yaw orientation component data 74, pitch orientation component data 75, and third orientation data 76. The game process data 67 includes various data (data representing a game parameter, and the like) used for the game process, in addition to the data shown in FIG. 13.

The first orientation data 68 is data representing the first orientation calculated by using the angular rate data 63. In the present embodiment, the first orientation is represented as 3×3 matrix M1 represented in equation (1) as follows.

$$M1 = \begin{bmatrix} Xx & Yx & Zx \\ Xy & Yy & Zy \\ Xz & Yz & Zz \end{bmatrix} \quad (1)$$

The matrix M1 is a rotation matrix representing a rotation from a predetermined reference orientation to a current orientation of the input device 8. Hereinafter, the matrix M1 representing the first orientation is referred to as a "first orientation matrix M1". The first orientation represented by the first orientation matrix M1 is an orientation in an xyz-coordinate system (the space coordinate system described above) having, as an originating point, a predetermined position in a space including the input device 8. In the xyz-coordinate system, under the assumption that the input device 8 is positioned in front of the marker section 6, the direction from the input device 8 toward the marker section 6 is defined as the z-axis positive direction, the vertically upward direction (the direction opposite to the direction of gravity) is defined as the y-axis positive direction, and the direction leftward from the direction from the input device 8 toward the marker section 6 is defined as the x-axis positive direction. The predetermined reference orientation is an orientation in which the imaging direction of the input device 8 positioned in front of the marker section 6 indicates the center of the marker section 6, and the button surface of the controller 5 faces vertically upward (that is, the predetermined reference orientation is an orientation in which the X-axis, the Y-axis, and the Z-axis based on the input device 8 correspond to the x-axis, the y-axis, and the z-axis, respectively). Although in the present embodiment the first orientation is represented by using the matrix, the first orientation may be presented by using a third-order vector or three angles in another embodiment.

The acceleration magnitude data 69 is data representing a magnitude (length) L of the acceleration vector Va1 represented by the acceleration data 64.

The correction rate data 70 is data representing a rate (correction rate A) at which the first orientation is corrected by using the second orientation. The correction rate A represents a value in a range of $0 \leq A \leq C1$ (C1 is a predetermined constant in a range of $0 \leq C1 \leq 1$). As described below in detail, the greater the correction rate A is, the closer the corrected first orientation is to the second orientation.

The correction amount vector data 71 is data representing a vector (is the vector v3 shown in FIG. 9, and hereinafter is referred to as a correction amount vector) indicating an amount of correction for correcting the first orientation. The correction amount vector Vg is calculated based on the vector Va2, in the xyz-coordinate system, corresponding to the acceleration vector Va1, and the correction rate A.

The correction matrix data 72 is data representing a rotation matrix (referred to as a correction matrix) Ma used for correcting the first orientation. That is, in the first correction process, the first orientation is corrected by multiplying, by the correction matrix Ma, the first orientation matrix M1 representing the first orientation. The correction matrix Ma is calculated based on the vector Va2 and the correction amount vector Vg.

The roll orientation component data 73 is data representing an orientation component (roll orientation component) M3r associated with the roll direction, among orientation components included in the third orientation calculated based on an image of a subject to be taken. Further, the yaw orientation component data 74 is data representing an orientation component (yaw orientation component) M3y associated with the yaw direction, among the orientation components included in the third orientation, and the pitch orientation component data 75 is data representing an orientation component (pitch orientation component) M3p associated with the pitch direction, among the orientation components included in the third orientation. The roll direction, the yaw direction, and the pitch direction described above are rotation directions relative to the imaging direction (Z-axis positive direction) of the input device 8. In the present embodiment, the orientation components M3r, M3y, and M3p are each represented as a 3×3 matrix, as with the first orientation.

The third orientation data 76 is data representing the third orientation calculated from an image of a subject to be taken. In the present embodiment, the third orientation is represented as a 3×3 matrix M3, as with the first orientation. Hereinafter, the matrix M3 representing the third orientation is referred to as a "third orientation matrix M3". In the present embodiment, the marker coordinate data is transmitted as the operation data from the input device 8, and the third orientation matrix M3 is calculated based on the marker coordinate data 65. Specifically, the third orientation matrix M3 is obtained by combining the orientation components M3r, M3y, and M3p.

Figure 14:
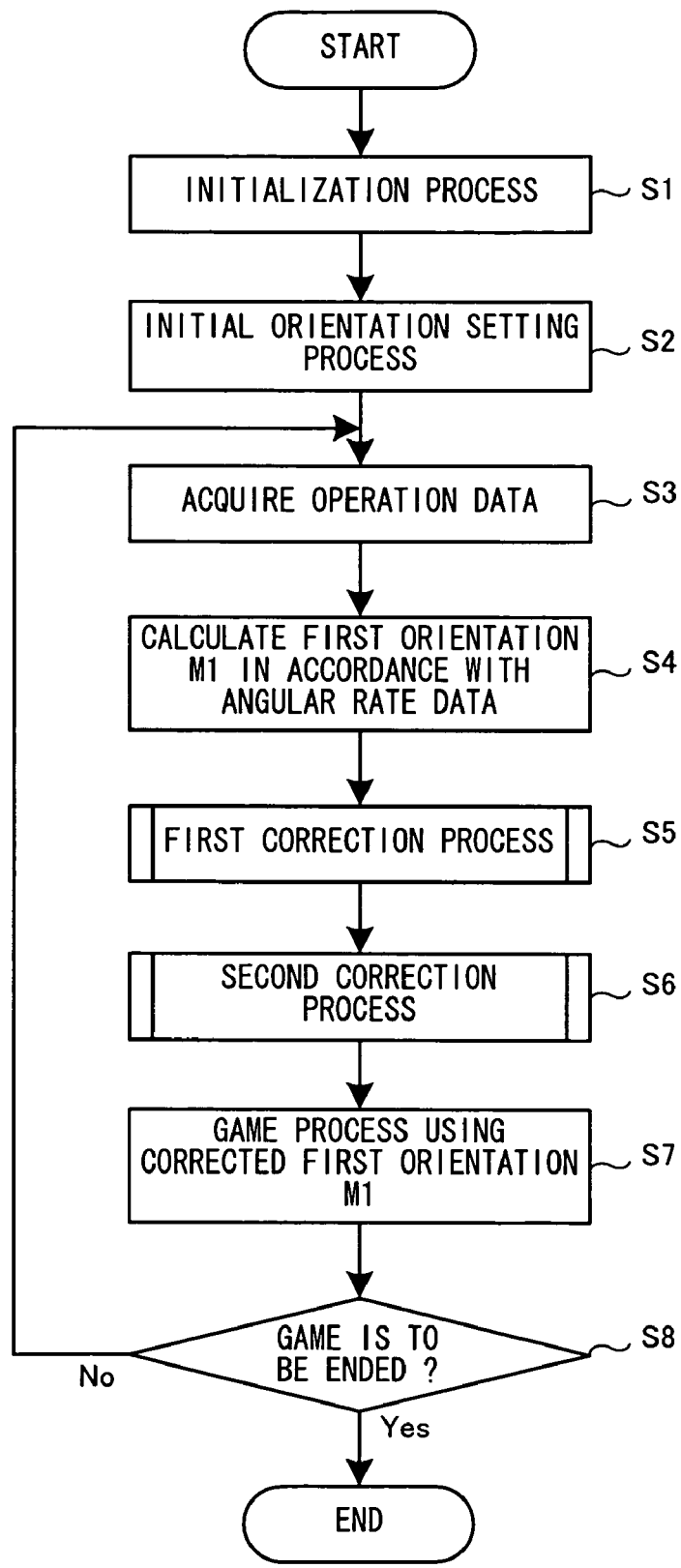
FIG. 14 is a main flow chart showing a flow of a process performed by the game apparatus.

Next, the process performed by the game apparatus 3 will be described in detail with reference to FIG. 14 to FIG. 17. FIG. 14 is a main flow chart showing a flow of the process performed by the game apparatus 3. When the game apparatus 3 is powered on, the CPU 10 of the game apparatus 3 executes a boot program stored in a boot ROM not shown, so as to initialize the respective units such as the main memory. The game program stored in the optical disc 4 is loaded to the main memory, and the CPU 10 starts executing the game program. The flow chart of FIG. 14 illustrates a process performed when the processes described above are completed.

Firstly, in step S1, the CPU 10 executes initialization process for a game. In the initialization process, values of various parameters used for the game process are initialized, a virtual game space is constructed, and a player object and other objects are positioned at initial positions in the game space. Following step S1, a process step of step S2 is performed.

In step S2, the CPU 10 performs initial orientation setting process. Specifically, a predetermined value is set as an initial orientation of the first orientation of the input device 8 when a player performs a predetermined operation (for example, an operation of pressing the A button 32d). The reference orientation is an orientation in which the Y-axis is parallel to the vertical direction, and the imaging direction of the input device 8 is toward the center (the middle point between the markers 6R and 6L) of the marker section 6, and therefore it is preferable that a player performs the predetermined operation while holding the input device 8 such that the initial orientation is the reference orientation. However, when the input device is almost in a static state, and an image of the marker section can be taken, the initial orientation can be calculated. When the predetermined operation is performed, the CPU 10 stores data of the matrix representing the initial orientation, as the first orientation data, in the main memory. Following step S2, a process loop of steps S3 to S8 is repeatedly performed during the game play. One process loop is performed every frame time (for example, every 1/60 seconds).

Although in the present embodiment the initial orientation setting process (step S2) is performed once before the game is started (before the process loop of steps S3 to S8 is performed), the initial orientation setting process may be performed at any time while the game is being played, in another embodiment. That is, the CPU 10 may perform the initial orientation setting process each time a player performs the predetermined operation during the game play In step S3, the CPU 10 obtains the operation data. That is, the operation data transmitted from the controller 5 is received through the wireless controller module 19. The angular rate data, the acceleration data, the marker coordinate data, the operation button data included in the received operation data are stored in the main memory. Following step S3, the process step of step S4 is performed.

In step S4, the CPU 10 calculates the first orientation based on the angular rate data 63 stored in the main memory. Any method may be used to calculate the orientation of the input device 8 based on the angular rate. In the present embodiment, the first orientation is calculated by using the most recent angular rate (the angular rate obtained in the current process loop) and the first orientation having been obtained for the immediately preceding time (the first orientation calculated in the process loop immediately preceding the current process loop). Specifically, the CPU 10 sets, as the first orientation, an orientation obtained by rotating the first orientation having been obtained for the immediately preceding time, at the most recent angular rate, for a unit time period. The first orientation having been obtained for the immediately preceding time is represented by the first orientation data 68 stored in the main memory, and the most recent angular rate is represented by the angular rate data 63 stored in the main memory. Data representing the orientation (the 3×3 matrix) calculated in step S4 is stored, as the updated first orientation data 68, in the main memory. Following step S4, the process step of step S5 is performed.

In step S5, the CPU 10 performs the first correction process described above. The first correction process is a process for correcting the first orientation by using the acceleration data. Hereinafter, the first correction process will be described in detail with reference to FIG. 15.

Figure 15:
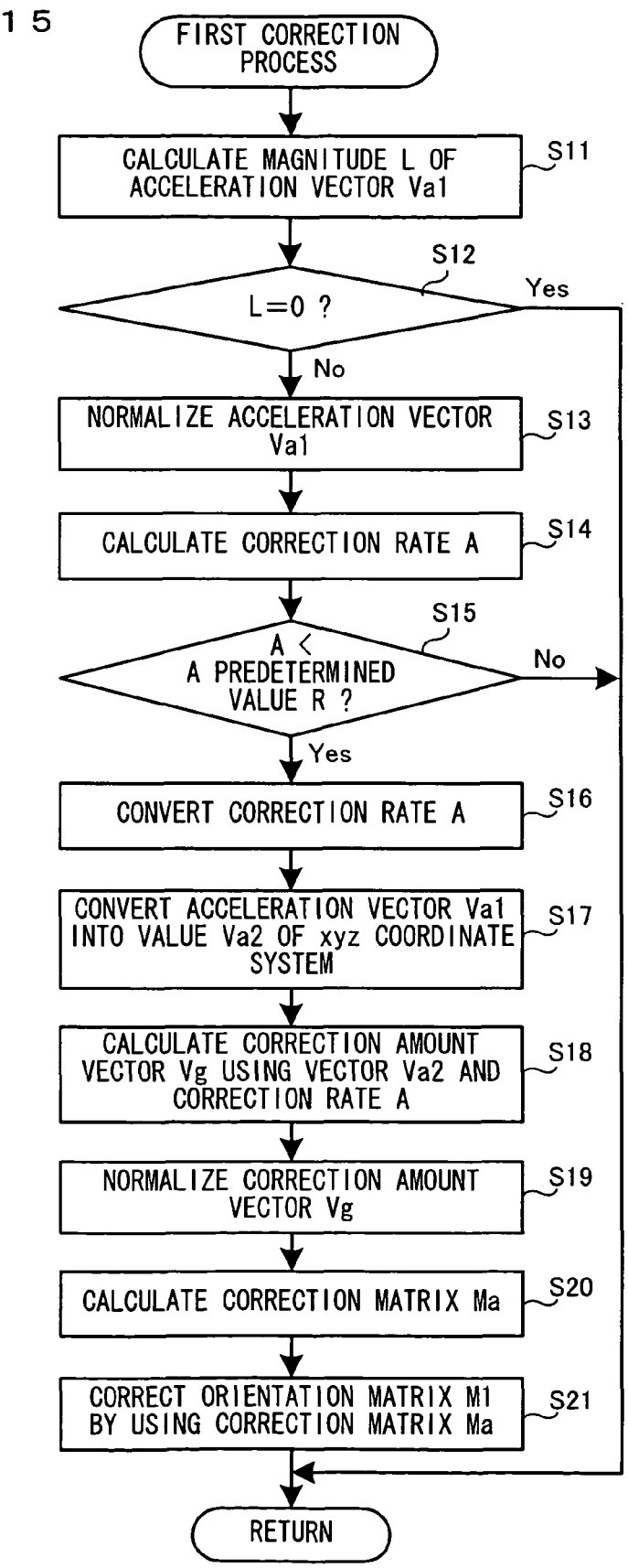
FIG. 15 is a flow chart showing a flow of the first correction process (step S5) shown in FIG. 14.

FIG. 15 is a flow chart showing a flow of the first correction process (step S5) shown in FIG. 14. In the first correction process, initially, the CPU 10 calculates a magnitude L of an acceleration detected by the acceleration sensor 37 in step S11. Specifically, the acceleration data 64 stored in the main memory is read, and the magnitude L of the acceleration vector Va1 represented by the acceleration data 64 is calculated. Data representing the calculated magnitude L is stored as the acceleration magnitude data 69 in the main memory. Following step S11, the process step of step S12 is performed.

In step S12, the CPU 10 determines whether or not the magnitude of the acceleration detected by the acceleration sensor 37 is 0. That is, the acceleration magnitude data 69 stored in the main memory is read, and whether or not the magnitude L represented by the acceleration magnitude data 69 is 0 is determined. When a determination result of step S12 is negative, the process step of step S13 is performed. On the other hand, when the determination result of step S12 is affirmative, the following process steps of steps S13 to S21 are skipped, and the CPU 10 ends the first correction process. Thus, in the present embodiment, when the magnitude of the acceleration detected by the acceleration sensor 37 is 0, the correction using the acceleration is not made. This is because when the magnitude of the acceleration is 0, the direction of gravity can not be calculated based on the detection result from he acceleration sensor 37, and when the magnitude of the acceleration vector represents 0, the following process steps of steps S13 to S21 are difficult to perform.

In step S13, the CPU 10 normalizes the acceleration vector Va1 detected by the acceleration sensor 37. Specifically, the acceleration data 64 stored in the main memory is read, and the acceleration vector Va1 represented by the acceleration data 64 is transformed so as to have a magnitude of 1. The CPU 10 stores, in the main memory, data representing the acceleration vector Va1 having been normalized. Following step S13, the process step of step S14 is performed.

In step S14, the CPU 10 calculates the correction rate A representing a rate at which the first orientation is corrected in the first correction process. The correction rate A is calculated based on the magnitude L of the acceleration vector Va1 having not been normalized. Specifically, the CPU 10 reads the acceleration magnitude data 69 stored in the main memory. The correction rate A is calculated by using the magnitude L represented by the acceleration magnitude data 69 in accordance with equation (2) as follows.

$$A = |L - 1| \tag{2}$$

Data representing the correction rate A calculated in accordance with equation 2 is stored as the correction rate data 70 in the main memory. The correction rate A calculated in accordance with equation (2) does not represent a final value but represents a value being calculated, and the value is converted in the following step S16 so as to obtain a final value of the correction rate A. Following step S14, the process step of step S15 is performed.

In step S15, the CPU 10 determines whether or not the correction rate A calculated in step S14 is smaller than a predetermined value R. The predetermined value R is previously set to, for example, 0.4. As describe above, in the present embodiment, the magnitude of the gravitational acceleration detected by the acceleration sensor 37 represents "1", and further the correction rate A represents an absolute value of a difference between "1" and the magnitude L of the acceleration vector Va1 (as represented by equation (2)). Therefore, that the correction rate A is greater than or equal to the predetermined value R indicates that a difference between the magnitude L of the acceleration vector Va1 and the magnitude of the gravitational acceleration represents a value greater than or equal to the predetermined value R. When the determination result of step S15 is affirmative, the process step of step S16 is performed. On the other hand, when the determination result of step S15 is negative, the following process steps of steps S16 to S21 are skipped, and the CPU 10 ends the first correction process.

As described above, in the present embodiment, only when a difference between the magnitude L of an acceleration detected by the acceleration sensor 37 and the magnitude (=1) of the gravitational acceleration is smaller than a predetermined reference (the predetermined value R), the correction is made, and when the difference between the magnitude L and the magnitude of the gravitational acceleration is greater than or equal to the predetermined reference, the correction is not made. In a state where the input device 8 is being moved, an acceleration caused due to an inertia generated by moving the input device 8 is detected by the acceleration sensor 37 in addition to the gravitational acceleration, and the magnitude L of the detected acceleration vector Va1 represents a value other than "1", and when the input device 8 is being vigorously moved, the magnitude L represents a value which is substantially away from "1". Therefore, when the difference between the magnitude L and the magnitude of the gravitational acceleration is greater than or equal to the predetermined reference, it is assumed that the input device 8 is being vigorously moved. On the other hand, when the input device 8 is being vigorously moved, the acceleration vector Va1 detected by the acceleration sensor 37 contains a lot of components (components of an acceleration due to the inertia) other than the gravitational acceleration, and therefore a value of the acceleration vector Va1 may not be reliable as a value representing the direction of gravity. Therefore, in the determination process of step S15, whether or not the input device 8 is being vigorously moved is determined, in other words, whether or not a value of the acceleration vector Va1 is reliable as a value representing the direction of gravity is determined. In the present embodiment, when it is determined in the determination process of step S15 that the value of the acceleration vector Va1 is not reliable as a value representing the direction of gravity, the correction is not made, and only when the value of the acceleration vector Va1 is reliable of a value representing the direction of gravity, the correction is made. Thus, it is possible to prevent inaccurate correction of the first orientation due to the first orientation being corrected by using the acceleration vector Va1 which is not reliable as a value representing the direction of gravity.

In step S16, the CPU 10 converts a value of the correction rate A. In the present embodiment, the correction rate A is converted such that the closer the magnitude L of the detected acceleration vector Va1 is to the magnitude of the gravitational acceleration, the closer the correction rate A is to 1. Specifically, the CPU 10 reads the correction rate data 70 stored in the main memory, and converts the correction rate A represented by the correction rate data 70 in accordance with equations (3) to (5) as follows.

$$A2=1-(A1/R) \quad (3)$$

$$A3=A2\times A2 \quad (4)$$

$$A4=A3\times C1 \quad (5)$$

In equations (3) to (5), a variable A1 represents a non-converted correction rate (a value represented by the correction rate data 70 which has been most recently stored in the main memory), and a variable A4 is a correction rate to be finally obtained through the conversion in step S16. In equation (3), the correction rate A2 is obtained through the conversion such that the closer the magnitude of the non-converted correction rate A1 is to the magnitude (=1) of the gravitational acceleration, the closer the magnitude of the converted correction rate A1 is to 1. In equation (4), the correction rate A3 is obtained through the conversion such that the closer the non-converted correction rate A2 is to 1, the greater the weight of the converted correction rate A2 is. In equation (5), an amount of correction is adjusted. That is, the greater a value of a constant C1 is, the greater the amount of correction is. The constant C1 is previously set so as to have a value (for example, 0.03) in a range of $0 \leq C1 \leq 1$. Data representing the correction rate A4 obtained through the conversion using equations (3) to (5) is stored, as the updated correction rate data 70, in the main memory. Following step S16, the process step of step S17 is performed.

Although in the present embodiment the conversions are performed by using equations (3) to (5), a part or all of the conversions using equations (3) to (5) maybe eliminated in another embodiment. However, when the conversion using equation (3) is eliminated, it is necessary to interchange the acceleration vector Va2 with the direction-of-gravity vector (0, −1, 0) in equation (7) used in step S18 described below.

In step S17, the CPU 10 converts the acceleration vector Va1 represented by using the XYZ-coordinate system into a value Va2 of the xyz-coordinate system. The acceleration vector Va2 of the xyz-coordinate system is calculated by converting the acceleration vector Va1 having been normalized, by using the first orientation matrix M1 representing the first orientation obtained in the immediately preceding frame. That is, the CPU 10 reads data of the (normalized) acceleration vector Va1 stored in the main memory in step S13, and the first orientation data 68. The acceleration vector Va2 of the xyz-coordinate system is calculated by using the acceleration vector Va1 and the first orientation matrix M1 represented by the first orientation data 68. More specifically, the acceleration vector Va1 having been normalized is represented as Va1=(nx, ny, nz), and the components of the first orientation matrix M1 are represented as variables, respectively, in equation (1), and the acceleration vector Va2 to be represented by using the xyz-coordinate system is represented as Va2=(vx, vy, vz). In this case, the acceleration vector Va2 is calculated in accordance with equation (6) as follows.

$$vx=Xx\times nx+Yx\times ny+Zx\times nz$$

$$vy=Xy\times nx+Yy\times ny+Zy\times nz$$

$$vz=Xz\times nx+Yz\times ny+Zz\times nz \quad (6)$$

As represented in equation (6), the acceleration vector Va2 is obtained by rotating the acceleration vector Va1 by using the first orientation matrix M1 corresponding to the rotation matrix. The acceleration vector Va2 calculated in step S17 is stored in the main memory. Following step S17, the process step of step S18 is performed.

In step S18, the CPU 10 calculates the correction amount vector Vg by using the correction rate A and the acceleration vector Va2 represented by using the xyz-coordinate system. The correction amount vector Vg is calculated by using the correction rate obtained through the conversion in step S16, and the vector (0, −1, 0) representing the vertically downward direction (the direction of gravity) in the xyz-coordinate system. Specifically, the CPU 10 reads the correction rate data 70 stored in the main memory, and calculates the correction amount vector Vg=(gx, gy, gz) by using the correction rate A represented by the correction rate data 70 in accordance with equation (7) as follows.

$$gx=(0-vx)\times A+vx$$

$$gy=(-1-vy)\times A+vy$$

$$gz=(0-vz)\times A+vz \quad (7)$$

As represented in equation (7), the correction amount vector Vg is a vector ending at a point at which a line segment connecting from an end point of the acceleration vector Va2 to an end point of the direction-of-gravity vector (0, −1, 0) is internally divided at A: (1−A). Therefore, the greater the value of the correction rate A is, the closer the correction amount vector Vg is to the direction-of-gravity vector. The CPU 10 stores data representing the correction amount vector Vg calculated in equation (7) as the correction amount vector data 71 in the main memory. Following step S18, the process step of step S19 is performed.

In step S19, the CPU 10 normalizes the correction amount vector Vg calculated in step S18. That is, the correction amount vector data 71 stored in the main memory is read, and a vector represented by the correction amount vector data 71 is normalized. Data representing the normalized vector is stored as the updated correction amount vector data 71 in the main memory. The correction amount vector Vg calculated in step S19 corresponds to the vector v3 shown in FIG. 9. Following step S19, the process step of step S20 is performed.

In step S20, the CPU 10 calculates the correction matrix Ma for correcting the first orientation. The correction matrix Ma is calculated based on the acceleration vector Va2 represented by using the xyz-coordinate system, and the correction amount vector Vg obtained through the normalization in step S19. Specifically, the CPU 10 reads the acceleration vector Va2 stored in the main memory in step S17, and the correction amount vector data 71. A rotation matrix for rotating the acceleration vector Va2 so as to coincide with the correction amount vector Vg is calculated, and the calculated rotation matrix is set to the correction matrix Ma. That is, the correction matrix Ma is a rotation matrix for performing rotation by an angle Δθ shown in FIG. 9. Data representing the correction matrix Ma calculated in step S20 is stored as the correction matrix data 72 in the main memory. Following step S20, the process step of step S21 is performed.

In step S21, the CPU 10 corrects the first orientation matrix M1 representing the first orientation by using the correction matrix Ma. Specifically, the CPU 10 reads the first orientation data 68 and the correction matrix data 72 stored in the main memory. The first orientation matrix M1 represented by the first orientation data 68 is converted by using the correction matrix Ma represented by the correction matrix data 72 (a product of the first orientation matrix M1 and the correction matrix Ma is calculated). The converted first orientation matrix M1 represents the corrected first orientation. That is, in the process step of step S21, the vector v1 shown in FIG. 10 is rotated by the angle Δθ. The CPU 10 stores data representing the converted first orientation matrix M1 as the updated first orientation data 68 in the main memory. Following step S21, the CPU 10 ends the first correction process.

As described above, in the first correction process, calculated is the correction amount vector Vg between the acceleration vector detected by the acceleration sensor 37 and the direction-of-gravity vector (vector G shown in FIG. 8A) (steps S18 and S19), and the first orientation is corrected by a correction amount (the correction matrix Ma. The angle Δθ shown in FIG. 9) represented by the correction amount vector Vg (step S21). Thus, the first orientation (the vector v1 or the angle θ1 shown in FIG. 8A) calculated by the gyro sensors 55 and 56 is corrected so as to approach the second orientation (the angle θ2 shown in FIG. 8A) determined by the acceleration sensor 37. Through this correction, the first orientation is corrected so as to represent a more accurate value.

Further, in the first correction process, the higher the reliability of the acceleration vector Va1 is (the smaller a difference between the magnitude L of the acceleration vector Va1 and the magnitude of the gravitational acceleration is), the greater a value of the correction rate A is, so that the first orientation is corrected so as to more closely approach the second orientation. In other words, the higher the reliability of the acceleration vector Va1 is, the greater the amount of correction is, so that the corrected first orientation is strongly influenced by the second orientation. Thus, in the present embodiment, the amount of correction is determined in the first correction process based on the reliability of the acceleration sensor vector Va1, and therefore the amount of correction is appropriately determined in accordance with the reliability, which leads to accurate calculation of the orientation of the input device 8.

In the present embodiment, the correction amount vector Vg calculated in step S18 is a vector ending at a point at which a line segment connecting from an end point of the acceleration vector Va2 to an end point of the direction-of-gravity vector is internally divided at A:(1−A), and the greater a value of the correction rate A is, the closer the correction amount vector Vg is to the direction-of-gravity vector. In another embodiment, depending on a method for calculating the correction rate A, the correction amount vector Vg may be determined such that the correction amount vector Vg is a vector ending at a point at which a line segment connecting from an end point of the direction of-gravity vector to an end point of the acceleration vector Va2 is internally divided at (1−A) :A, and the smaller a value of the correction rate A is, the closer the correction amount vector Vg is to the direction-of-gravity vector. In this case, in step S20, a rotation matrix for rotating the correction amount vector Vg so as to represent the direction of gravity is calculated, and the calculated rotation matrix is set to the correction matrix Ma. Also in this case, the correction can be similarly performed as in the present embodiment.

Returning to the description of FIG. 14, following step S5, in step S6, the CPU 10 performs the second correction process described above. The second correction process is a process for correcting the first orientation by using the marker coordinate data. Hereinafter, the second correction process will be described in detail with reference to FIG. 16.

Figure 16:
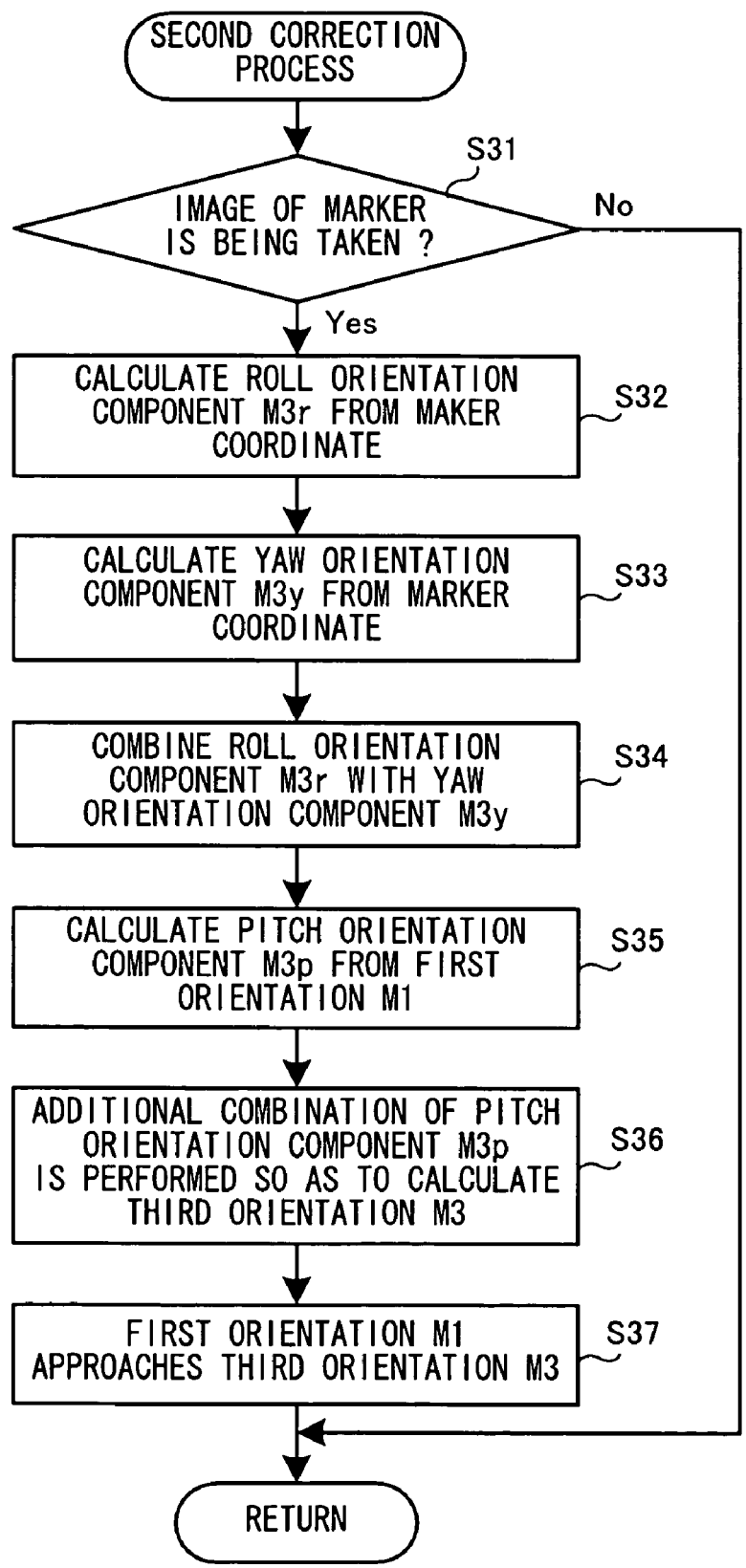
FIG. 16 is a flow chart showing a flow of the second correction process (step S6) shown in FIG. 14.

FIG. 16 is a flow chart showing a flow of the second correction process (step S6) shown in FIG. 14. In the first correction process, firstly, in step S31, the CPU 10 determines whether or not an image of the marker section 6 is taken by the image pickup means (the image pickup element 40) of the input device 8. The determination of step S31 can be performed by referring to the marker coordinate data 65 stored in the main memory. When the marker coordinate data 65 represents two marker coordinate points, it is determined that an image of the marker section 6 is taken, and when the marker coordinate data 65 represents one marker coordinate point only, or when the marker coordinate point is not obtained, it is determined that an image of the marker section 6 is not taken. When the determination result of step S31 is affirmative, the following process steps of steps S32 to S37 are performed. On the other hand, when the determination result of step S31 is negative, the following process steps of steps S32 to S37 are skipped, and the CPU 10 ends the second correction process. Thus, when an image of the marker section 6 is not taken by the image pickup element 40, the orientation of the input device 8 cannot be calculated by using data obtained from the image pickup element 40. Therefore, in this case, the correction is not made in the second correction process.

In step S32, the CPU 10 calculates the roll orientation component M3r based on the marker coordinate data. The roll orientation component M3r is calculated based on the direction of the marker section 6 in the pickup image, that is, based on a tilt of a line connecting between two marker coordinate points represented by the marker coordinate data 65. Hereinafter, an exemplary method for calculating the roll orientation component M3r will be described with reference to FIG. 17.

Figure 17:
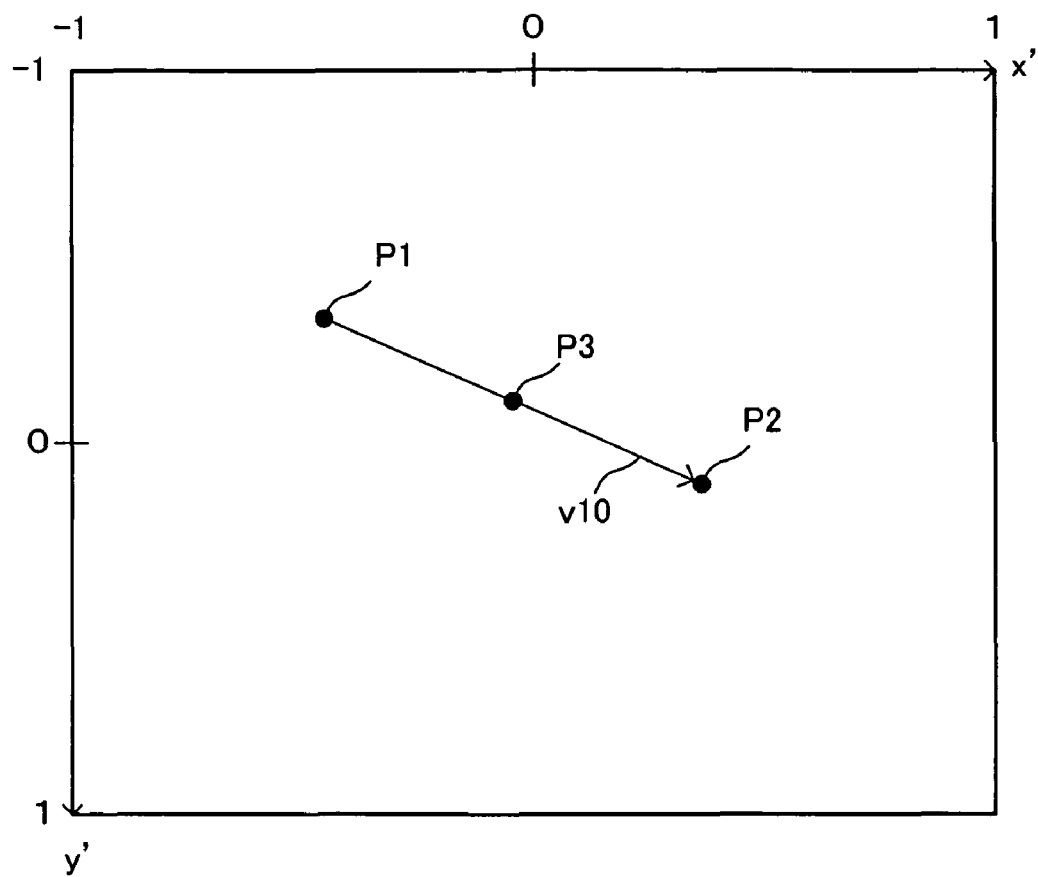
FIG. 17 is a diagram illustrating a two-dimensional coordinate corresponding to a pickup image.

FIG. 17 is a diagram illustrating a two-dimensional coordinate system for the pickup image. As show in FIG. 17, in the present embodiment, in a two-dimensional coordinate system (x'y' coordinate system) for representing positions in the pickup image, a range of the pickup image is represented so as to satisfy $-1 \leq x' \leq 1$, and $-1 \leq y' \leq 1$. In the x'y' coordinate system, when the input device 8 is in the reference orientation (an orientation in which the imaging direction of the input device 8 is toward the center of the marker section 6, and the button surface of the controller 5 is facing toward the vertically upward direction), the vertically downward direction in the pickup image corresponds to the y'-axis positive direction, and the rightward direction therein corresponds to the x'-axis positive direction. Further, a point P1 and a point P2 shown in FIG. 17 represent marker coordinate positions, and a point P3 is a middle point between the point P1 and the point P2. The vector v10 shown in FIG. 17 is a vector starting from the point P1 and ending at the point P2.

In order to calculate the roll orientation component M3r, the CPU 10 firstly reads the marker coordinate data 65, and calculates the vector v10 based on the two marker coordinate points represented by the marker coordinate data 65. Further, a vector (hx, hy) obtained by normalizing the vector v10 is calculated. The vector (hx, hy) represents the x'-axis positive direction when the input device 8 is in the reference orientation, and changes its direction in accordance with the input device 8 rotating in the roll direction. The vector (hx, hy) represents the orientation associated with the roll direction, and the roll orientation component M3r can be calculated based on the vector (hx, hy). Specifically, the CPU 10 calculates the roll orientation component M3r in accordance with equation (8) as follows.

$$M3r = \begin{bmatrix} hx & -hy & 0 \\ hy & hx & 0 \\ 0 & 0 & 1 \end{bmatrix} \quad (8)$$

Data representing a matrix calculated in accordance with equation (8) is stored as the roll orientation component data 73 in the main memory. Following step S32, the process step of step S33 is performed.

In step S33, the CPU 10 calculates the yaw orientation component M3y based on the marker coordinate data. The yaw orientation component M3y is calculated based on the direction and the position of the marker section 6 in the pickup image. Hereinafter, an exemplary method for calculating the yaw orientation component M3y will be described with reference to FIG. 17.

Firstly, the CPU 10 reads the marker coordinate data 65, and calculates a middle point between the two marker coordinate points represented by the marker coordinate data 65. In the present embodiment, the middle point is used as a position of the marker section 6. Further, the CPU 10 calculates a coordinate point (px, py) by rotating a coordinate point representing the calculated middle point, by a rotation angle associated with the roll direction of the input device 8, around the originating point of the x'y' coordinate system (in the direction opposite to the rotation direction of the input device 8). In other words, the coordinate point representing the middle point is rotated around the originating point such that the vector (hx, hy) represents the x-axis positive direction. When the input device 8 and the marker section 6 are positioned at the same lateral (the x-axis direction) position (that is, the input device 8 is in front of the marker section 6), the orientation associated with the yaw direction can be calculated from the coordinate point (px, py) obtained through the rotation described above.

Next, the CPU 10 calculates the rotation angle θ y associated with the yaw direction based on the coordinate point (px, py) obtained by rotating the middle point, and an angle (limited angle) θ y', in the yaw direction, which is obtained when the marker section 6 is at the edge in the x'-axis direction. The limited angel θ y' and an x-coordinate value px' which corresponds to the limited angle θ y' and is obtained by rotating the middle point, can be previously obtained. Therefore, the rotation angle θ y associated with the yaw direction can be calculated because a ratio between px and px' is equal to a ratio between θ y and θ y'. Specifically, the rotation angle θ y associated with the yaw direction can be calculated by using equation (9) as follows.

$$\theta y = px \times \theta y'/px' \quad (9)$$

When the length of the marker section 6 in the lateral direction is not considered, the limited angle θ y' may be ½ of an angel of view of the controller 5, and the value of the px' may be "1".

Finally, the CPU 10 calculates, as the yaw orientation component M3y, the rotation matrix for performing rotation by the angle θ y calculated by using equation (9). Specifically, the yaw orientation component M3y is calculated in accordance with equation (10) as follows.

$$M3y = \begin{bmatrix} \cos\theta y & 0 & -\sin\theta y \\ 0 & 1 & 0 \\ \sin\theta y & 0 & \cos\theta y \end{bmatrix} \quad (10)$$

Data representing the matrix calculated in accordance with equation (10) is stored as the yaw orientation component data 74 in the main memory. Following step S33, the process step of step S34 is performed.

In step S34, the CPU 10 combines the roll orientation component M3r with the yaw orientation component M3y. That is, the roll orientation component data 73 and the yaw orientation component data 74 are read from the main memory, and multiplies the roll orientation component M3r represented by the data 73, by the yaw orientation component M3y represented by the data 74. Following step S34, the process step of step S35 is performed.

In step S35, the CPU 10 calculates the pitch orientation component M3p based on the first orientation. It is possible to calculate the pitch orientation component M3p based on a y-coordinate value of the coordinate point (px, py) in the same manner as that used for the yaw orientation component M3y although the manner is not used in the present embodiment. However, the method for calculating the orientation in the yaw direction (the pitch direction) by using the coordinate point (px, py) can be used when the input device 8 and the marker section 6 are positioned on the same lateral (vertical in the case of the pitch direction) position. In the game system 1 of the present embodiment, a player may operate the input device 8 almost in front of the marker section 6 (the television 2) such that the input device 8 and the marker section 6 are positioned on the same lateral position, and therefore it is possible to calculate the orientation in the yaw direction in the manner used in step S33 based on the assumption that "the input device 8 and the marker section 6 are positioned on the same lateral position". On the other hand, a player may stand to operate the input device 8 or sit to operate the input device 8, and further the marker section 6 may be positioned above the screen of the television 2 or under the screen of the television 2. Therefore, in the game system 1 of the present embodiment, it is not always assumed that "the input device 8 and the marker section 6 are positioned on the same vertical position", and therefore the orientation in the pitch direction may not be calculated by using the coordinate point (px, py).

In the present embodiment, the first orientation is used as it is for the pitch orientation component M3$p$ (therefore, in the second correction process, no correction is made for the pitch direction). Specifically, the CPU 10 reads the first orientation data 68 from the main memory. The rotation angle θ p associated with the pitch direction is calculated in accordance with equation (11) by using components of the first orientation matrix M1 represented by the first orientation data 68.

$$\cos(\theta p) = (Zx \times Zx + Zz \times Zz)^{1/2}$$

$$\sin(\theta p) = Zy \tag{11}$$

The variables Zx, Zy, and Zz in equation (11) represent the elements, respectively, in the first orientation matrix M1 represented in equation (1). The first orientation matrix M1 used here is the first orientation matrix M1 obtained through the first correction process performed in the current process loop. Further, the CPU 10 calculates a matrix of the pitch orientation component M3$p$ by using cos(θ p) and sin(θ p) calculated in equation (11), in accordance with equation (12).

$$M3p = \begin{bmatrix} 1 & 0 & 0 \\ 0 & \cos\theta p & \sin\theta p \\ 0 & -\sin\theta p & \cos\theta p \end{bmatrix} \tag{12}$$

Data representing the matrix calculated by using equation (12) is stored as the pitch orientation component data 75 in the main memory. Following step S35, the process step of step S36 is performed.

In step S36, the CPU 10 calculates the third orientation based on the orientation components of the roll direction, the yaw direction, and the pitch direction. The third orientation is obtained by further combining the pitch orientation component M3$p$ with the combination result of the roll orientation component M3$r$ and the yaw orientation component M3$y$. Specifically, the CPU 10 reads the pitch orientation component data 75 from the main memory, and multiplies the matrix calculated in step S34 by the pitch orientation component M3$p$ represented by the pitch orientation component data 75. Data representing the calculated matrix is stored as the third orientation data 76 in the main memory. Following step S36, the process step of step S37 is performed.

In step S37, the CPU 10 corrects the first orientation by using the third orientation. The correction of step S37 is made such that the first orientation matrix M1 approaches the third orientation matrix M3 at a predetermined rate (a constant C2 described below). The CPU 10 reads the first orientation data 68 and the third orientation data 76 from the main memory. The correction is made by using the first orientation matrix M1 represented by the first orientation data 68 and the third orientation matrix M3 represented by the third orientation data 76, in accordance with equation (13).

$$M1 = (M3 - M1') \times C2 + M1' \tag{13}$$

In equation (13), the variable M1' represents an uncorrected first orientation matrix. Further, the constant C2 is previously set to a value in a range of 0<C2≦1, for example, previously set to 0.1. Data representing the corrected first orientation matrix M1 calculated in accordance with equation (13) is stored as the updated first orientation data 68 in the main memory. Following step S37, the CPU 10 ends the second correction process.

As described above, in the second correction process, the third orientation is calculated from the pickup image (the marker coordinate point), and the first orientation is corrected so as to approach the third orientation. Through this correction, the first orientation can be corrected so as to represent a more accurate value. Although in the present embodiment the third orientation associated with the roll direction and the yaw direction only is calculated from the pickup image, the third orientation associated with the pitch direction can be calculated from the pickup image as described above, and, in another embodiment, the third orientation associated with the roll direction, the yaw direction, and the pitch direction may be calculated from the pickup image. Further, in the second correction process, the third orientation associated with at least one of the roll direction, the yaw direction, and the pitch direction may be calculated.

Returning to the description of FIG. 14, following step S6, in step S7, the CPU 10 performs the game process by using the corrected first orientation. This game process maybe any process in which the first orientation matrix M1 representing the corrected first orientation is used as an input value so as to obtain a game result. For example, in the process, an object in a virtual game space may be controlled and displayed such that the object has an orientation represented by the first orientation matrix M1, or the object may be controlled and displayed such that the object is moved at a rate corresponding to an angle between a predetermined orientation and the orientation represented by the first orientation matrix M1. Following step S7, the process step of step S8 is performed.

In step S8, the CPU 10 determines whether or not the game is to be ended. The determination of step S8 is performed based on, for example, whether or not the game is cleared, whether or not the game is over, or whether or not a player issues an instruction for stopping the game. When the determination result of step S8 is negative, the process step of step S3 is performed again. Thereafter, the process loop of steps S3 to S8 is repeated until it is determined in step S8 that the game is to be ended. On the other hand, when the determination result of step S8 is affirmative, the CPU 10 ends the game process shown in FIG. 14. This is the end of the game process.

As described above, in the present embodiment, the first orientation of the input device 8 is calculated based on the angular rates detected by the gyro sensors 55 and 56 (step S4), and the first orientation is corrected in the first correction process (S5) and the second correction process (S6). The game process is performed by using the corrected first orientation (step S7), and therefore the CPU 10 is allowed to perform the game process based on an accurate orientation of the input device 8. Therefore, for example, the orientation of the input device 8 can accurately represent the orientation of an object in a game space, thereby enhancing the operability of the game.

[Exemplary Modification]

Although in the present embodiment the three-dimensional orientation is calculated by using the gyro sensor for detecting for angular rates around the three axes, example embodiments of the present invention are applicable to calculation of the orientation (rotation angle) on the two-dimensional plane as shown in FIGS. 8 to 12. The orientation on the two-dimensional plane may be calculated by detecting for angular rates around two axes by using a two-axis gyro sensor, or calculated by detecting for an angular rate around a predetermined axis by using a one-axis gyro sensor.

Further, in another embodiment, the second correction process may be performed only when it is assumed that the input device 8 is taking an image of the marker section 6. Specifically, the CPU 10 determines whether or not the input device 8 (the image pickup means) is facing toward a direction in which an image of the marker section 6 can be taken, before the second correction process is performed. This determination can be performed by using the first orientation or the second orientation. For example, it may be determined whether the imaging direction of the input device 8 is the same as or opposite to the direction from the input device 8 to the marker section 6 in the first orientation (or the second orientation). Further, the first orientation used for the determination may be the first orientation having been subjected to the first and the second correction processes in the immediately preceding process loop or may be the first orientation having been calculated and subjected to the first correction process in the current process loop.

When the CPU 10 determines that the input device 8 is facing toward the direction in which an image of the marker section 6 can be taken, the second correction process is performed, and when the CPU 10 determines that the input device 8 is not facing toward the direction in which an image of the marker section 6 can be taken, the second correction process is skipped. An object (for example, an electric light in a room, or a sunlight outside a window) other than the marker section 6 maybe erroneously detected as the marker section 6, and when the third orientation is calculated by using the marker coordinate point having been erroneously detected, and the second correction process is performed by using such a third orientation, the correction cannot be accurately made. On the other hand, when the determination process as described above is performed, it is possible to prevent the second correction process from being performed by using the third orientation calculated from the marker coordinate point having been erroneously detected. Therefore, the second correction process can be performed with enhanced accuracy.

As described above, an aspect of example embodiments of the present invention is to, for example, accurately calculate an orientation of an input device by using the gyro sensor, and example embodiments of the present invention are applicable as, for example, a game apparatus or a game program for performing a game process in accordance with the orientation of the input device.

While the invention has been described in detail, the foregoing description is in all aspects illustrative and not restrictive. It is understood that numerous other modifications and variations can be devised without departing from the scope of the invention.

What is claimed is:

1. An orientation calculation apparatus for obtaining data from an input device comprising at least a gyro sensor, an acceleration sensor, and an image pickup device, so as to calculate an orientation of the input device, the orientation calculation apparatus comprising:

orientation calculation programmed logic circuitry for calculating a first orientation of the input device in accordance with an angular rate detected by the gyro sensor;

first correction programmed logic circuitry for correcting the first orientation in accordance with acceleration data detected by the acceleration sensor; and second correction programmed logic circuitry for correcting the first orientation in accordance with an image of a predetermined subject to be taken by the image pickup device.

2. The orientation calculation apparatus according to claim 1, wherein the first correction programmed logic circuitry corrects the first orientation so as to approach a second orientation of the input device, the second orientation being an orientation in which a direction of an acceleration represented by the acceleration data is a vertically downward direction.

3. The orientation calculation apparatus according to claim 2, wherein the first correction programmed logic circuitry corrects the first orientation such that the closer a magnitude of the acceleration is to a magnitude of a gravitational acceleration, the more closely the first orientation approaches the second orientation.

4. The orientation calculation apparatus according to claim 1, wherein the first correction programmed logic circuitry corrects the first orientation only when a difference between a magnitude of the acceleration and a magnitude of a gravitational acceleration is smaller than a predetermined reference value.

5. The orientation calculation apparatus according to claim 1, wherein the second correction programmed logic circuitry corrects the first orientation so as to approach a third orientation of the input device at a predetermined rate, the third orientation being an orientation which is calculated from a direction and/or a position of the predetermined subject in an image taken by the image pickup device.

6. The orientation calculation apparatus according to claim 5, wherein the second correction programmed logic circuitry calculates, among the third orientation, an orientation, associated with a roll direction, relative to an imaging direction of the image pickup device, based on the direction of the predetermined subject in the image taken by the image pickup device.

7. The orientation calculation apparatus according to claim 5, wherein the second correction programmed logic circuitry calculates, among the third orientation, an orientation, associated with a pitch direction or/and a yaw direction, relative to an imaging direction of the image pickup device, based on the position of the predetermined subject in the image taken by the image pickup device.

8. The orientation calculation apparatus according to claim 5, wherein the second correction programmed logic circuitry determines, based on the first orientation, whether or not the image pickup device is facing toward a direction in which the image pickup device is allowed to take the image of the predetermined subject, and corrects the first orientation only when the image pickup device is facing toward the direction in which the image pickup device is allowed to take the image of the predetermined subject.

9. The orientation calculation apparatus according to claim 1, wherein the second correction programmed logic circuitry corrects the first orientation having been corrected by the first correction programmed logic circuitry.

10. A game apparatus for performing a game process by using, as the orientation of the input device, the first orientation corrected by the orientation calculation apparatus according to claim 1.

11. An orientation calculation apparatus for obtaining data from an input device comprising at least a gyro sensor and an acceleration sensor, so as to calculate an orientation of the input device, the orientation calculation apparatus comprising:
   orientation calculation programmed logic circuitry for calculating a first orientation of the input device in accordance with an angular rate detected by the gyro sensor; and
   correction programmed logic circuitry for correcting the first orientation such that the first orientation approaches a second orientation of the input device, the second orientation being an orientation in which a direction of an acceleration represented by acceleration data detected by the acceleration sensor is a vertically downward direction.

12. The orientation calculation apparatus according to claim 11, wherein the correction programmed logic circuitry corrects the first orientation such that the closer a magnitude of the acceleration is to a magnitude of a gravitational acceleration, the more closely the first orientation approaches the second orientation.

13. The orientation calculation apparatus according to claim 11, wherein the correction programmed logic circuitry corrects the first orientation only when a difference between a magnitude of the acceleration and a magnitude of a gravitational acceleration is smaller than a predetermined reference value.

14. A game apparatus for performing a game process by using, as the orientation of the input device, the first orientation corrected by the orientation calculation apparatus according to claim 11.

15. An orientation calculation apparatus for obtaining data from an input device comprising at least a gyro sensor and an image pickup device, so as to calculate an orientation of the input device, the orientation calculation apparatus comprising:
   orientation calculation programmed logic circuitry for calculating a first orientation of the input device in accordance with an angular rate detected by the gyro sensor; and
   correction programmed logic circuitry for correcting the first orientation so as to approach a second orientation of the input device at a predetermined rate, the second orientation being an orientation which is calculated from a direction and/or a position of a predetermined subject in an image taken by the image pickup device.

16. A game apparatus for performing a game process by using, as the orientation of the input device, the first orientation corrected by the orientation calculation apparatus according to claim 15.

17. An orientation calculation apparatus for obtaining data from an input device comprising at least a gyro sensor, an acceleration sensor, and an image pickup device, so as to calculate an orientation of the input device, the orientation calculation apparatus comprising:
   orientation calculation programmed logic circuitry for calculating a first orientation of the input device in accordance with an angular rate detected by the gyro sensor;
   first correction programmed logic circuitry for correcting the first orientation such that the closer a magnitude of an acceleration represented by the acceleration data is to a magnitude of a gravitational acceleration, the more closely the first orientation approaches a second orientation of the input device, the second orientation being an orientation in which a direction of the acceleration represented by the acceleration data is a vertically downward direction; and
   second correction programmed logic circuitry for correcting the first orientation so as to approach a third orientation of the input device at a predetermined rate, the third orientation being an orientation which is calculated from a direction and/or a position of the imaging subject in an image taken by the image pickup device,
   wherein the first correction programmed logic circuitry corrects the first orientation only when a difference between the magnitude of the acceleration and the magnitude of the gravitational acceleration is smaller than a predetermined reference value, and
   wherein the second correction programmed logic circuitry calculates, among the third orientation, an orientation, associated with a roll direction, relative to an imaging direction of the image pickup device, based on the direction of the predetermined subject in the image taken by the image pickup device, and calculates, among the third orientation, an orientation, associated with a pitch direction or/and a yaw direction, relative to the imaging direction of the image pickup device, based on the position of the predetermined subject in the image taken by the image pickup device.

18. The orientation calculation apparatus according to claim 17, wherein the second correction programmed logic circuitry determines, based on the first orientation, whether or not the image pickup device is facing toward a direction in which the image pickup device is allowed to take an image of the predetermined subject, and corrects the first orientation only when the image pickup device is facing toward the direction in which the image pickup device is allowed to take the image of the predetermined subject.

19. The orientation calculation apparatus according to claim 17, wherein the second correction programmed logic circuitry corrects the first orientation having been corrected by the first correction programmed logic circuitry.

20. A game apparatus for performing a game process by using, as the orientation of the input device, the first orientation corrected by the orientation calculation apparatus according to claim 17.

21. A non-transitory computer-readable medium containing computer instructions stored therein for causing a computer processor to perform a method of orientation calculation for obtaining data from an input device comprising at least a gyro sensor, an acceleration sensor, and an image pickup device, so as to calculate an orientation of the input device, the method comprising:
   calculating a first orientation of the input device in accordance with an angular rate detected by the gyro sensor;
   performing a first correction including correcting the first orientation in accordance with acceleration data detected by the acceleration sensor; and
   performing a second correction including correcting the first orientation in accordance with an image of a predetermined subject to be taken by the image pickup device.

22. The non-transitory computer-readable medium according to claim 21, wherein the first correction includes correcting the first orientation so as to approach a second orientation of the input device, the second orientation being an orientation in which a direction of an acceleration represented by the acceleration data is a vertically downward direction.

23. The non-transitory computer-readable medium according to claim 22, wherein the first correction includes correcting the first orientation such that the closer a magnitude of the acceleration is to a magnitude of a gravitational acceleration, the more closely the first orientation approaches the second orientation.

24. The non-transitory computer-readable medium according to claim 21, wherein the first correction includes correcting the first orientation only when a difference between a magnitude of the acceleration and a magnitude of a gravitational acceleration is smaller than a predetermined reference value.

25. The non-transitory computer-readable medium according to claim 21, wherein the second correction includes correcting the first orientation so as to approach a third orientation of the input device at a predetermined rate, the third orientation being an orientation which is calculated from a direction and/or a position of the predetermined subject in an image taken by the image pickup device.

26. The non-transitory computer-readable medium according to claim 25, wherein the second correction includes calculating, among the third orientation, an orientation, associated with a roll direction, relative town imaging direction of the image pickup device, based on the direction of the predetermined subject in the image taken by the image pickup device.

27. The non-transitory computer-readable medium according to claim 25, wherein the second correction calculating, among the third orientation, an orientation, associated with a pitch direction or/and a yaw direction, relative to an imaging direction of the image pickup device, based on the position of the predetermined subject in the image taken by the image pickup device.

28. The non-transitory computer-readable medium according to claim 25, wherein the second correction includes determining, based on the first orientation, whether or not the image pickup device is facing toward a direction in which the image pickup device is allowed to take the image of the predetermined subject, and correcting the first orientation only when the image pickup device is facing toward the direction in which the image pickup device is allowed to take the image of the predetermined subject.

29. The non-transitory computer-readable medium according to claim 21, wherein the second correction includes correcting the first orientation having been corrected by the first correction.

30. A non-transitory computer-readable medium having stored therein a game program for performing a game process by using, as the orientation of the input device, the first orientation corrected by the orientation calculation program according to claim 21.

31. A computer-readable non-transitory computer-readable medium containing computer instructions stored therein for causing a computer processor to perform a method of orientation calculation for obtaining data from an input device comprising at least a gyro sensor and an acceleration sensor, so as to calculate an orientation of the input device, the method comprising:
    calculating a first orientation of the input device in accordance with an angular rate detected by the gyro sensor; and
    performing a correction including correcting the first orientation such that the first orientation approaches a second orientation of the input device, the second orientation being an orientation in which a direction of an acceleration represented by acceleration data detected by the acceleration sensor is a vertically downward direction.

32. The non-transitory computer-readable medium according to claim 31, wherein the correction includes correcting the first orientation such that the closer a magnitude of the acceleration is to a magnitude of a gravitational acceleration, the more closely the first orientation approaches the second orientation.

33. The non-transitory computer-readable medium according to claim 31, wherein the correction includes correcting the first orientation only when a difference between a magnitude of the acceleration and a magnitude of a gravitational acceleration is smaller than a predetermined reference value.

34. A non-transitory computer-readable medium having stored therein a game program for performing a game process by using, as the orientation of the input device, the first orientation corrected by the orientation calculation program according to claim 31.

35. A non-transitory computer-readable medium containing computer instructions stored therein for causing a computer processor to perform a method of orientation calculation for obtaining data from an input device comprising at least a gyro sensor and an image pickup device, so as to calculate an orientation of the input device, the method comprising:
    calculating a first orientation of the input device in accordance with an angular rate detected by the gyro sensor; and
    performing a correction including correcting the first orientation so as to approach a second orientation of the input device at a predetermined rate, the second orientation being an orientation which is calculated from a direction and/or a position of a predetermined subject in an image taken by the image pickup device.

36. A non-transitory computer-readable medium having stored therein a game program for performing a game process by using, as the orientation of the input device, the first orientation corrected by the orientation calculation program according to claim 35.

37. A non-transitory computer-readable medium containing computer instructions stored therein for causing a computer processor to perform a method of an orientation calculation for obtaining data from an input device comprising at least a gyro sensor, an acceleration sensor, and an image pickup device, so as to calculate an orientation of the input device, the method comprising:
    calculating a first orientation of the input device in accordance with an angular rate detected by the gyro sensor;
    performing a first correction including correcting the first orientation such that the closer a magnitude of an acceleration represented by the acceleration data is to a magnitude of a gravitational acceleration, the more closely the first orientation approaches a second orientation of the input device, the second orientation being an orientation in which a direction of the acceleration represented by the acceleration data is a vertically downward direction; and
    performing a second correction including correcting the first orientation so as to approach a third orientation of the input device at a predetermined rate, the third orientation being an orientation which is calculated from a direction and/or a position of the imaging subject in an image taken by the image pickup device,
    wherein the first correction includes correcting the first orientation only when a difference between the magnitude of the acceleration and the magnitude of the gravitational acceleration is smaller than a predetermined reference value, and wherein the second correction includes calculating, among the third orientation, an orientation, associated with a roll direction, relative to an imaging direction of the image pickup device, based on the direction of the predetermined subject in the image taken by the image pickup device, and calculating, among the third orientation, an orientation, associated with a pitch direction or/and a yaw direction, relative to the imaging direction of the image pickup device, based on the position of the predetermined subject in the image taken by the image pickup device.

38. The non-transitory computer-readable medium according to claim 37, wherein the second correction includes determining, based on the first orientation, whether or not the image pickup device is facing toward a direction in which the image pickup device is allowed to take an image of the predetermined subject, and corrects the first orientation only when the image pickup device is facing toward the direction in which the image pickup device is allowed to take the image of the predetermined subject.

39. The non-transitory computer-readable medium according to claim 37, wherein the second correction includes correcting the first orientation having been corrected by the first correction.

40. A non-transitory computer-readable medium having stored therein a game program for performing a game process by using, as the orientation of the input device, the first orientation corrected by the orientation calculation program according to claim 37.

* * * * *